US012602844B2

(12) United States Patent
Uhrenholt

(10) Patent No.: US 12,602,844 B2
(45) Date of Patent: Apr. 14, 2026

(54) GRAPHICS PROCESSOR

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 159 days.

(21) Appl. No.: 18/398,645

(22) Filed: Dec. 28, 2023

(65) Prior Publication Data

US 2025/0218068 A1     Jul. 3, 2025

(51) Int. Cl.
*G06T 1/20* (2006.01)
*G06T 11/20* (2006.01)

(52) U.S. Cl.
CPC ............... *G06T 11/20* (2013.01); *G06T 1/20* (2013.01); *G06T 2210/12* (2013.01)

(58) Field of Classification Search
CPC ...................................................... G06T 11/20
See application file for complete search history.

(56) References Cited

U.S. PATENT DOCUMENTS

| | | | | |
|---|---|---|---|---|
| 8,654,122 B2 * | 2/2014 | Hasselgren | ............. | G06T 15/40 345/426 |
| 9,092,345 B2 * | 7/2015 | Nystad | ................... | G06F 9/3888 |
| 9,256,466 B2 * | 2/2016 | Nystad | ................... | G06F 9/3887 |
| 9,317,948 B2 * | 4/2016 | Tapply | ................... | G06T 11/40 |
| 10,019,802 B2 * | 7/2018 | Kim | ......................... | G06T 11/40 |
| 10,430,996 B2 * | 10/2019 | Hazel | ........................ | G06T 15/60 |
| 10,665,010 B2 * | 5/2020 | Hazel | ..................... | G06T 17/005 |
| 10,665,208 B2 * | 5/2020 | Martin | .................... | G09G 5/026 |
| 10,839,600 B2 * | 11/2020 | Hazel | ..................... | G06T 17/10 |
| 10,937,233 B2 * | 3/2021 | Ruud | ..................... | G06T 15/005 |
| 11,361,400 B1 * | 6/2022 | Kjoll | ......................... | G06T 1/20 |
| 11,361,485 B2 * | 6/2022 | Uhrenholt | .............. | G06T 11/40 |
| 11,481,951 B2 * | 10/2022 | Yang | ......................... | G06T 1/20 |
| 11,699,258 B2 * | 7/2023 | Yang | ......................... | G06T 1/20 345/422 |
| 11,961,160 B2 * | 4/2024 | Stepuch | ................. | G06T 11/40 |
| 12,456,251 B2 * | 10/2025 | Davison | ............... | G06T 17/005 |
| 2020/0380758 A1 * | 12/2020 | Novales | ................... | G06T 1/60 |
| 2023/0388651 A1 * | 11/2023 | Larsen | .................... | H04N 23/73 |
| 2024/0169612 A1 * | 5/2024 | Stepuch | ................... | G06T 1/60 |
| 2024/0169643 A1 * | 5/2024 | Stepuch | ................... | G06F 9/50 |
| 2024/0193719 A1 * | 6/2024 | Langtind | ................. | G06T 1/20 |
| 2024/0193720 A1 * | 6/2024 | Stepuch | ................... | G06T 1/20 |
| 2024/0348935 A1 * | 10/2024 | Larsen | .................... | G06T 5/92 |
| 2025/0111463 A1 * | 4/2025 | Uhrenholt | ............ | G06T 15/005 |
| 2025/0111464 A1 * | 4/2025 | Underwood | ............. | G06T 1/20 |
| 2025/0111467 A1 * | 4/2025 | Uhrenholt | ................ | G06T 1/20 |
| 2025/0131523 A1 * | 4/2025 | Langtind | ................. | G06T 1/20 |
| 2025/0131653 A1 * | 4/2025 | Langtind | ............... | G06T 17/20 |
| 2025/0218068 A1 * | 7/2025 | Uhrenholt | ................ | G06T 1/20 |

* cited by examiner

*Primary Examiner* — Cheng Yuan Tseng

(74) *Attorney, Agent, or Firm* — Leveque Intellectual Property Law, P.C.

(57) ABSTRACT

A tile-based graphics processor performs first and second processing passes to generate a render output. The first processing pass generates and writes out information representative of a set of bounding boxes, and the second processing pass uses the bounding box information to determine which primitives to process for which rendering tiles.

20 Claims, 16 Drawing Sheets

GRAPHICS PROCESSOR

Figure 1:
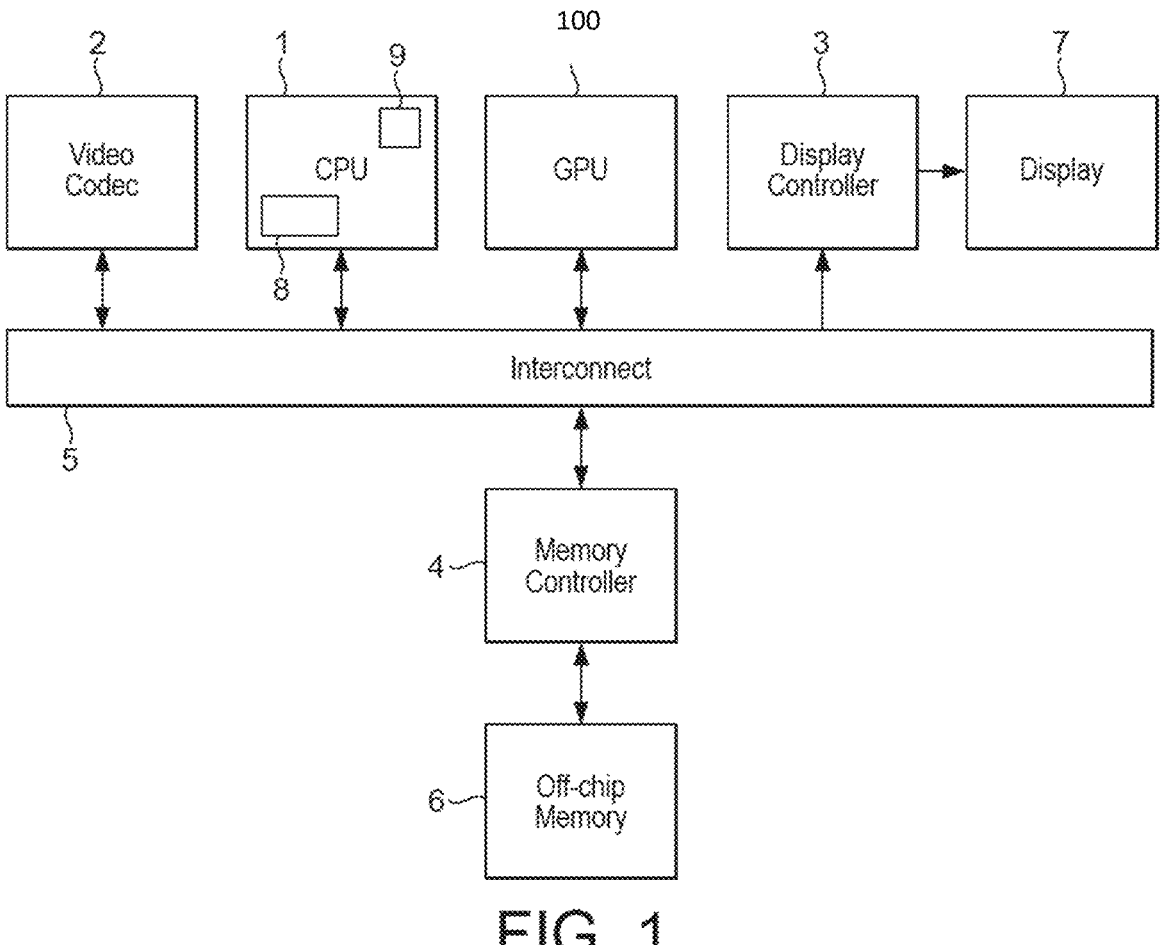

The present invention relates to computer graphics processing, and in particular to tile-based graphics processing.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles, quadrilaterals, points, lines, or groups thereof.

Each primitive is usually defined by and represented as a set of vertices (e.g. three vertices in the case of triangular primitive). Typically, the set of vertices to be used for a given graphics processing output (e.g. frame for display) will be stored as a set of vertex data defining the vertices, e.g. the relevant attributes for each of the vertices. These attributes will typically include position data and other, non-position data (varyings), e.g. defining colour, light, normal, texture coordinates, etc, for the vertex in question.

The vertices to be used for each primitive to be generated can be stored in order such that, in effect, the set of vertices will correspondingly define the primitives to be processed. It is also known to define the primitives separately in terms of a set of indices that reference the vertices in the set of vertex data. This can then avoid, for example, the need to duplicate vertices in the set of vertex data, as a single vertex entry (vertex) in the set of vertices can be referred to multiple times by reusing the relevant index in the set of indices.

Accordingly, initially provided geometry data for an output to be generated can typically comprise a set of vertices (vertex data) to be used and processed for generating the output, and optionally a set (sequence) of indices referencing the set of vertices (to, in effect, define how the vertices will be used to form a set of primitives to be processed when generating the output).

The initially provided geometry (vertex) data is processed by a graphics processor to generate the desired graphics processing output (render target), such as a frame for display. This typically comprises "assembling" primitives using the vertices, e.g. based on the vertex order or based on the set (sequence) of vertex indices, and then processing the so-assembled primitives.

The primitive assembly operation assembles the primitives that are to be processed by the graphics processing pipeline from the provided geometry data, e.g. in accordance with a defined primitive type or types that are to be assembled (e.g. simple triangles, triangle strips, or triangle fans, etc.).

The primitive processing may involve, for example, determining which sampling points of an array of sampling points associated with the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process typically determines the sample positions that should be used for a primitive (i.e. the (x, y) positions of the sample points to be used to represent the primitive in the output, e.g. frame to be displayed).

The rendering process then derives (samples) the data, such as red, green and blue (RGB) colour values and an "Alpha" (transparency) value, necessary to represent the primitive at the sample points (i.e. "shades" each sample point). This can involve, for example, applying textures, blending sample point data values, etc.

The rasterising and rendering processes use the vertex attributes (vertex data) associated with the vertices of the primitive that is being processed. To facilitate this operation, at least some of the attributes of the vertices defined for the given graphics processing output are usually subjected to a so-called "vertex shading" (vertex processing) operation, before the primitives are, e.g. rasterised and rendered. This vertex processing operation operates to transform the attributes for a vertex into a desired form for the subsequent graphics processing operation(s).

This vertex processing typically comprises a position shading operation which transforms vertex position attributes from the model or user space that they are initially defined in, to the screen space that the output of the graphics processing system is to be displayed in. The vertex processing may also comprise transforming non-position vertex data (varyings) appropriately.

Vertex processing operations are usually performed by one or more programmable execution units of the graphics processor, commonly referred to as "shader cores". The shader cores execute shader programs on input data values to generate a desired set of output data for processing.

Once vertex attributes have been shaded, the vertex shaded (transformed) data is typically written out (e.g. to memory) for use when processing the vertices (and the primitives to which they relate).

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". The render output is typically divided (by area) into regularly-sized and shaped rendering tiles (they are usually e.g., squares or rectangles). The tiles are each rendered separately (e.g., one after another). The rendered tiles are then combined to provide the complete render output (e.g. frame for display).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.

In a tile-based graphics processing pipeline, the primitives for the render output being generated are typically sorted into primitive listing regions of the render output area, so as to allow the primitives that need to be processed for a given region (tile) of the render output to be identified. This sorting allows primitives that need to be processed for a given region (tile) of the render output to be identified so as to, e.g., avoid unnecessarily rendering primitives that are not actually present in a region (tile).

The tiling (sorting) process is typically performed by a hardware unit of the graphics processor that is provided specifically for that purpose, usually referred to as a "tiling unit" (or "tiler"). The tiling process typically involves producing lists of (assembled) primitives to be rendered for different primitive listing regions of the render output (commonly referred to as "primitive" or "tile" lists). In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning"). A render output primitive listing region for which a primitive list is prepared can be a single rendering tile, or a group of plural rendering tiles, etc.

The tiling process can be carried out at varying levels of precision. For example, at the most precise level, it can be determined exactly which primitive listing region(s) a given primitive intersects, and the primitive then included in the primitive list(s) for that primitive listing region(s) only. This is commonly referred to as "exact" tiling. Alternatively, a "less precise" tiling technique may be used, such as "bounding box" tiling. In bounding box tiling, a bounding box is drawn around a primitive, and then the primitive listing region(s) covered by the bounding box are determined. The primitive that the bounding box represents (i.e. that is encompassed by the bounding box) is then typically listed (binned) for each primitive listing region that the bounding box has been found to cover (at least in part). This can simplify the preparation of the primitive lists, e.g. as compared to "exact" tiling.

The primitive lists generated by the tiling process are typically written out, e.g. to memory. Once the primitive lists have been prepared for all the render output regions and written out, each rendering tile is processed, by reading the primitive list(s) for the rendering tile, and e.g. rasterising and rendering the primitives listed in the primitive list(s) for the rendering tile.

Thus, tile-based graphics processing typically comprises an initial, geometry ("tiling") processing pass in which primitives assembled from geometry data are sorted into primitive listing regions so as to generate primitive lists, and the generated primitive lists are written out (to memory). Typically, the geometry processing pass is performed in hardware by a tiling unit, with the tiling unit issuing requests for geometry transformation (vertex processing) operations to be performed in software by programmable execution units (shader cores) of the graphics processor executing appropriate (shader) programs. In a subsequent "fragment processing" pass, the rendering tiles are each rendered separately, with the primitive lists being read (from memory) to determine which primitives to process (e.g., rasterise and render) for which rendering tiles.

The inventor believes there remains scope for improvements to tiling and tile-based graphics processors.

According to a first aspect of the present invention, there is provided a tile-based graphics processor that is operable to generate a render output by processing primitives to generate rendering tiles that the render output is divided into; the tile-based graphics processor comprising:

a first processing circuit, wherein the first processing circuit comprises:

a plurality of programmable execution units; and a plurality of backend circuits, wherein each backend circuit is associated with a respective programmable execution unit of the plurality of programmable execution units; wherein the first processing circuit is operable to:

generate a multi-level hierarchical bounding box data structure comprising a set of bounding boxes representative of positions of a set of primitives to be processed to generate a render output, wherein each of the plurality of backend circuits concurrently write to the multi-level hierarchical bounding box data structure using atomic operations; and write out information representative of the set of bounding boxes;

and a second processing circuit operable to, for one or more rendering tiles that a render output is divided into:

use the multi-level hierarchical bounding box data structure generated by the first processing circuit to determine primitives of a set of primitives to process to generate the respective rendering tile; and process the determined primitives to generate the respective rendering tile.

According to a second aspect of the present invention, there is provided a method of operating a tile-based graphics processor that is operable to generate a render output by processing primitives to generate rendering tiles that the render output is divided into; the method comprising generating a render output by:

performing a first processing pass comprising:

generating a multi-level hierarchical bounding box data structure comprising a set of bounding boxes representative of positions of a set of primitives to be processed to generate a render output, wherein each of a plurality of backend circuits concurrently write to the multi-level hierarchical bounding box data structure using atomic memory operations; and writing out information representative of the set of bounding boxes;

and performing a second processing pass comprising, for one or more rendering tiles that the render output is divided into:

using the multi-level hierarchical bounding box data structure generated by the first processing pass to determine primitives of a set of primitives to process to generate the respective rendering tile; and processing the determined primitives to generate the respective rendering tile.

The first processing circuit and the second processing circuit may comprise separate circuits, or may be at least partially formed of shared processing circuits.

The present invention relates to tile-based graphics processing. Thus, in embodiments, a render output, e.g. frame (image) to be displayed, is generated by separately generating each rendering tile of plural rendering tiles that the render output is divided into, and combining the separately generated rendering tiles. In order to facilitate this, (at least) a first processing pass and a second processing pass are performed. The first processing pass (circuit) generates and writes out (e.g. stores) information (data) that is used in the second processing pass (circuit) to determine which primitives to process (e.g. rasterise and render) to generate a (each) particular rendering tile (and thus, in effect, which primitives do not need to be processed to generate a particular rendering tile).

As discussed above, in typical tile-based graphics processing arrangements, primitive lists generated and written out in a first processing pass are used in a second processing pass. In particular, in a "bounding box" tiling process, the first processing pass typically involves assembling primitives, and for each assembled primitive, drawing a bounding box around the primitive, and using the bounding box to sort the primitive into one or more primitive lists. (The bounding box is discarded once the primitive has been sorted). The generated primitive lists are then written out (to memory). The second processing pass then involves reading the primitive lists (from memory) to determine which primitives to process for which rendering tiles.

The inventor has recognised, however, that in such arrangements, primitive lists must typically be generated and written out in the first processing pass in serial order, e.g. so as to preserve the order in which the primitives are intended to be processed. This means that the primitive list generation and writing out processes must typically be performed in a serial fashion, which can create a performance "bottleneck" in the graphics processing pipeline. This primitive list generation and writing out "serialisation point" can also hinder scaling to different tiling performance levels.

In the present invention, in contrast, the information that is generated and written out in the first processing pass and used in the second processing pass is information representative of a set of bounding boxes.

The first processing pass may generate information representative of bounding boxes being written out (e.g., and in embodiments, to memory), for example, as a hierarchical bounding box data structure. The second processing pass can then start by reading (e.g., and in embodiments, from memory) the hierarchical bounding box data structure bounding box information to determine which primitives to process to generate which rendering tiles (e.g. instead of reading and using primitive lists). Since (in contrast with primitive list generation and writing out processes) bounding box generation and writing out processes can be parallelised-which can facilitate improved performance, as well as scaling to different performance levels.

It will be appreciated therefore, that the present invention provides an improved tile-based graphics processor.

The tile-based graphics processor should, and in embodiments does, generate an overall render output on a tile-by-tile basis. The render output (area) should thus be, and in embodiments is, divided into plural rendering tiles for rendering purposes.

The render output may comprise any suitable render output, such as frame for display, or render-to-texture output, etc. The render output will typically comprise an array of data elements (sampling points) (e.g. pixels), for each of which appropriate render output data (e.g. a set of colour value data) is generated by the graphics processor (in the second processing pass). The render output data may comprise colour data, for example, a set of red, green and blue, RGB values and a transparency (alpha, a) value. Where the graphics processor generates plural (e.g. a series of) render outputs, each render output may be generated in accordance with the present invention.

The tiles that the render output is divided into for rendering purposes can be any suitable and desired such tiles. The size and shape of the rendering tiles may normally be dictated by the tile configuration that the graphics processor is configured to use and handle.

The rendering tiles are in embodiments all the same size and shape (i.e. regularly-sized and shaped tiles are in embodiments used), although this is not essential. The tiles are in embodiments rectangular, and in embodiments square. The size and number of tiles can be selected as desired. In embodiments, each tile is 16×16, 32×32, or 64×64 data elements (sampling positions) in size (with the render output then being divided into however many such tiles as are required for the render output size and shape that is being used).

The tile-based graphics processor performs a first (geometry, e.g. tiling) processing pass and a second (e.g. fragment) processing pass in order to generate a render output (e.g. frame for display). The first processing pass (circuit) prepares a multi-level hierarchical bounding box data structure comprising bounding box information (data) for a set of primitives that is used in the second processing pass (circuit) to determine which primitives of the set to process (rasterise and render) for which rendering tiles that the render output is divided into. The second processing pass should be, and in embodiments is, performed after the bounding box information (data) has been generated and written out in the first processing pass. The second processing pass uses the (previously generated) bounding box information (data) generated in the first processing pass to, when rendering a (and in embodiments, each) tile of the render output, determine which primitives to process (rasterise and render) to generate the (respective) rendering tile, and processes (rasterise and render) the determined primitives to generate the (respective) rendering tile of the render output.

The first and second processing passes can be implemented by any suitable circuits of the graphics processor. In embodiments, the (first processing circuit of the) graphics processor comprises a geometry processing control unit (e.g. tiler) that is operable to cause the first (geometry/tiling) processing pass to be performed, and that in embodiments, is a fixed function hardware unit (circuit). The geometry processing control unit (e.g. tiler) may perform some or all of the processing operations of the first (geometry/tiling) processing pass.

In embodiments, the (second processing circuit of the) graphics processor comprises a rendering circuit that is operable to process primitives to generate rendering tiles of the render output, and a primitive providing circuit that uses the information generated in the first processing pass to determine primitives to process for a rendering tile, and provides the determined primitives to the rendering circuit for processing (in the second processing pass).

Thus, in embodiments, performing the second processing pass comprises the primitive providing circuit using bounding box data generated in the first processing pass to determine which primitives to process (rasterise and render) to generate a rendering tile and providing the determined primitives to the rendering circuit, and the rendering circuit processing (rasterising and rendering) the primitives provided by the primitive providing circuit to generate the respective rendering tile.

The rendering circuit may include a rasteriser and a fragment renderer. In embodiments, the rasteriser receives primitives from the primitive providing circuit, rasterises the primitives to fragments, and provides the fragments to the fragment renderer for processing. In embodiments, the fragment renderer is operable to perform fragment rendering to generate rendered fragment data, and may perform any appropriate fragment processing operations in respect of fragments generated by the rasteriser, such as texture mapping, blending, shading, etc.

The graphics processor may comprise one or more, e.g. plural, programmable execution units (e.g. shader cores) that are operable to perform graphics processing operations by executing (e.g. shader) program instructions. There may be any suitable number of programmable execution units (e.g. shader cores), such as 1, 2, 4, 8, 16, 32 or another number. The first and/or second processing pass may be performed, at least in part, by the one or more programmable execution units (e.g. shader cores), e.g. executing one or more (e.g. shader) programs.

In embodiments, the tile-based graphics processor comprises one or more tile buffers that store rendered data for a rendering tile being rendered by the tile-based graphics processor, until the tile-based graphics processor completes the rendering of the rendering tile. In embodiments, rendered fragment data generated by the fragment renderer is written to a tile buffer.

The tile buffer should be, and in embodiments is, provided local to (i.e. on the same chip as) the tile-based graphics processor, for example, and in embodiments, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processor, rendered data for the rendering tile in embodiments is written out from the tile buffer to other storage that is in embodiments external to (i.e. on a different chip to) the tile-based graphics processor, such as a frame buffer in external memory, for use. The graphics processor in embodiments includes a write out circuit coupled to the tile buffer for this purpose.

Thus, in embodiments, the graphics processor comprises, and/or is in communication with, a memory. The memory may, for example, be a main memory of the overall graphics processing system that the graphics processor is part of. In embodiments, it is a memory that is off chip from the processor, i.e. an external (main) memory (external to the processor).

The graphics processor may be in direct communication with the memory, or may communicate with the memory via a cache system. Thus, in embodiments, the graphics processor comprises a cache system that is operable to cache data stored in the memory for the graphics processor.

In the present invention, in the first processing pass, bounding box information (data) is generated and written out, e.g. and in embodiments, (from the graphics processor) to the memory and/or cache system. That is, the bounding box information (data) may be stored in the cache system and/or memory, e.g. externally (on a different chip) to the graphics processor or locally to the graphics processor. Correspondingly, in embodiments, the second processing pass comprises the bounding box information being read in (to the graphics processor) from the memory and/or cache system (e.g. by the primitive providing circuit).

The set of bounding boxes can be any suitable set of (plural) bounding boxes that represents primitive positions (e.g. in screen space), and that can be used in the second processing pass to determine which primitives to process (rasterise and render) for which rendering tiles. In embodiments, the bounding boxes are two-dimensional bounding boxes, e.g. polygons such as rectangles. The set of bounding boxes may include one or more bounding boxes that each bound only one primitive, and/or one or more bounding boxes that each bound plural primitives.

In embodiments, the set of bounding boxes comprises (at least) a set of (two-dimensional) primitive bounding boxes, wherein each primitive bounding box bounds a respective primitive of the set of primitives. In embodiments, the set of bounding boxes includes a respective primitive bounding box for each primitive of the set of primitives to be processed to generate the render output.

A primitive bounding box can be provided in any suitable manner. In embodiments, a (each) primitive bounding box is generated using vertex positions of a respective primitive. In embodiments, as discussed above, vertex positions are subject to vertex processing operations to transform them (e.g. to a screen space), and a (each) primitive bounding box is generated using transformed vertex positions. A (each) primitive bounding box may be, for example and in embodiments, e.g. a rectangle, determined from (and e.g. defined by) minimum and maximum (transformed) vertex positions of a respective primitive (e.g. in x and y screen space dimensions).

In embodiments, the set of bounding boxes is a (e.g. nested) hierarchy of (two-dimensional) bounding boxes, that e.g. comprises a respective set of bounding boxes for each "level" of plural levels of the hierarchy. In embodiments, a (each) primitive that the hierarchy of bounding boxes represents is bounded by plural different sized (two-dimensional) bounding boxes (at plural different "levels") of the hierarchy of bounding boxes. In embodiments, the set of primitive bounding boxes represents a "lowest level" of the hierarchy of bounding boxes, and the hierarchy includes one or more "higher levels" that are each represented by a respective set of "higher level" bounding boxes.

In embodiments, a (each) higher level bounding box bounds a (respective) subset of the set of bounding boxes at the next highest level of the hierarchy. A (each) higher level bounding box may be, for example and in embodiments, e.g. a rectangle, determined from (and e.g. defined by) minimum and maximum positions of the lower level bounding boxes which the higher-level bounding box bounds (e.g. in x and y screen space dimensions).

A (each) higher level bounding box may bound any suitable number of bounding boxes of the set of bounding boxes at the next lowest level of the hierarchy, such as two, four, eight, or another number of, bounding boxes. Similarly, the hierarchy of bounding boxes may include any suitable number of hierarchy levels, such as two, three, four, five, six, seven, eight, or another number of, levels.

Thus, in embodiments, performing the first processing pass comprises building a hierarchy of bounding boxes, and performing the second processing pass comprises (the primitive providing circuit) traversing the hierarchy of bounding boxes to determine the primitives to process to generate a (each) rendering tile.

In embodiments, the second processing pass comprises (the primitive providing circuit) determining that a primitive is a primitive to be processed (rasterised and rendered) to generate a rendering tile using plural different sized bounding boxes (at plural different levels) of the hierarchy of bounding boxes that bound that (same) primitive.

In embodiments, traversing the hierarchy of bounding boxes to determine the primitives to process to generate a rendering tile comprises determining whether the rendering tile overlaps a (and in embodiments, each) "highest-level" bounding box (at the highest level of the hierarchy). In embodiments, when it is determined that the rendering tile overlaps a highest-level bounding box, it is determined whether the rendering tile overlaps a (and in embodiments, each) "next highest-level" bounding box (at the next highest level of the hierarchy) that is bounded by the highest-level bounding box.

In embodiments, this traversal process is performed, as appropriate, for each level of the hierarchy, and thus may proceed, as appropriate, to the lowest (primitive) level of the hierarchy. Thus, in embodiments, when it is determined that the rendering tile overlaps a higher-level bounding box, it is determined whether the rendering tile overlaps a (and in embodiments, each) lower level bounding box that is bounded by the higher-level bounding box. In embodiments, when it is determined that the rendering tile overlaps a primitive bounding box (at the lowest level of the hierarchy), it is determined that the primitive that is bounded by the primitive bounding box is a primitive to be processed to generate the rendering tile. The primitive may thus be provided to the rendering circuit for processing (e.g. rasterising and rendering).

Thus, in embodiments, traversing the hierarchy of bounding boxes comprises iteratively testing a rendering tile (area)

against progressively smaller bounding boxes of the hierarchy of bounding boxes. In embodiments, traversing the hierarchy of bounding boxes to determine the primitives to process to generate a rendering tile comprises testing the rendering tile (area) against a larger (largest) bounding box of the hierarchy of bounding boxes to determine if the rendering tile (area) covers the larger (largest) bounding box (at least in part). If the rendering tile (area) does cover (at least in part) the larger (largest) bounding box, then the rendering tile (area) may be tested against a (each) smaller bounding box of the hierarchy of bounding boxes that the larger (largest) bounding box encompasses to determine if the rendering tile (area) covers the (respective) smaller bounding box (at least in part). This process may be repeated for a (each) bounding box encompassed by a bounding box found to be at least partially covered by the rendering tile (area), until a smallest bounding box size is reached. If the rendering tile (area) is found to cover (at least in part) a smallest bounding box, then it may be determined that any primitive bounded by the smallest bounding box is a primitive to be processed to generate the rendering tile.

In embodiments, the first processing pass (circuit) is "packetized", e.g. substantially as described in United Kingdom Patent Application No. 2217231.6, the entire context of which is incorporated herein by reference. Thus, in embodiments, the first processing pass (circuit) includes a "frontend" process that generates packets of one or more primitives, and a "backend" process that processes packets generated in the frontend process to generate the set (e.g. hierarchy) of bounding boxes. In embodiments, the backend process also writes out (stores) the information representative of the set (e.g. hierarchy) of bounding boxes.

In this case, in embodiments, the set of bounding boxes comprises a set of (two-dimensional) packet bounding boxes, wherein each packet bounding box bounds all of the one or more primitives of a respective packet. In embodiments, the set of bounding boxes includes a respective packet bounding box for each packet generated from the set of primitives. In embodiments, the bounding box may be defined as a component vector, preferably a four-component vector, defining maximum and minimum x and y values of the two-dimensional bounding box, i.e. x_min, x_max, y_min and y_max.

In embodiments, the lowest level of the hierarchy of bounding boxes is represented by the set of primitive bounding boxes, and the next (higher) level of the hierarchy of bounding boxes is represented by the set of packet bounding boxes. In embodiments, bounding boxes at the next (higher) hierarchy level are then generated by combining packet bounding boxes using atomic memory operations, and so on. Thus, in embodiments, packets of primitives are generated (in the frontend process), and the hierarchy of bounding boxes is generated based on the packets of primitives (in the backend process).

In embodiments, building the hierarchy of bounding boxes comprises: generating, for each primitive of a packet, a primitive bounding box that bounds the respective primitive; and generating, for each packet, a packet bounding box that bounds all of the one or more primitives of the respective packet. In embodiments, building the hierarchy of bounding boxes further comprises: generating, for each of one or more sets of plural packets, a respective higher-level bounding box of the multi-level hierarchical bounding box data structure that bounds all of the primitives of the plural packets of the respective set of plural packets using the atomic memory operations. In embodiments, the atomic memory operations include a commutative arithmetic operation and/or an associative arithmetic operation.

In the embodiments, an "atomic" memory operation is an operation sequence that performs an arithmetic operation between two (or more) bounding box component vectors stored in memory and then writes the resulting bounding box vector component to memory. This sequence of operations is carried out so that to every observer, it looks as if the sequence has either not been performed at all, or been performed in its entirety. It is executed as one indivisible unit, hence the name "atomic". If multiple atomics are performed on the same memory location, e.g. on the same bounding box vector component stored in the memory location, they are serialized. This is necessary to maintain the observable semantic that each of them has been performed either in full or not at all. The atomic memory operation enables the multi-level hierarchical bounding box data structure to be built by multiple (e.g. plural) concurrent programmable execution units. In other words, the bounding box expand operation, e.g. the atomic memory operation, performed by one backend circuit of the plurality of backend circuits will always be seen by another backend circuit of the plurality of backend circuits, thereby advantageously avoiding a race, or racy conditions.

In embodiments, the backend process may determine if the generated higher-level bounding box has been expanded in comparison to a next highest-level bounding box. In embodiments, each bounding box is preferably defined as a four-component vector representing a maximum and minimum dimensions of each two-dimensional bounding box and the determination of whether the generated higher-level bounding box has been expanded in comparison to a next highest-level bounding box preferably includes comparing each component of the four-component vector representing the generated higher-level bounding box to the respective component of the four-component vector representing the next highest-level bounding box.

The frontend process may generate packets in any suitable manner. In embodiments, the frontend process assembles primitives, and assigns assembled primitives to packets in order. In embodiments, a packet has a fixed capacity, e.g. an upper limit of vertices and/or primitives, and when the fixed capacity is reached, a new packet is started. There may be an upper limit of vertices of, for example, 64, 128 or 256 vertices, and/or an upper limit of primitives of, for example, 64, 128 or 256 primitives. Other numbers would be possible.

In embodiments, the frontend process operates to allocate memory space for storing a packet (in (the) memory), e.g. and in embodiments, when starting a new packet. Thus, in embodiments, the frontend process comprises allocating memory space for storing a packet, and storing the packet in the allocated memory space. Correspondingly, the backend process may comprise fetching the packet from the allocated memory space, and processing the packet.

In embodiments, the frontend process further operates to keep track of the order in which packets are generated. Thus, in embodiments, information indicating an order in which packets (for a drawcall/render output) are generated is maintained. In embodiments, the packet order indicating information is used in the second processing pass (circuit) so as to process (rasterise and render) primitives following the packet order.

The packet order indicating information can take any suitable form. In embodiments, an array is maintained (e.g. in (the) memory), and when a new packet is started, a next entry of the packet array is allocated, such that the order in which entries appear in the packet array corresponds to the order in which packets were generated. Allocating an entry of the packet array may comprise writing a pointer to the array entry, wherein the pointer points to a memory location at which the corresponding packet is stored.

In embodiments, the packet array also stores a packet bounding box for a (each) packet. In embodiments, the hierarchy of bounding boxes is built using the packet bounding boxes stored in the packet array. Other arrangements would be possible.

In embodiments, once a packet is completed, vertex processing operations for the primitives/vertices in the packet are triggered. The triggered vertex processing may comprise a position shading operation which transforms vertex position attributes from the model or user space that they are initially defined in, to the screen space that the render output is to be displayed in. The vertex processing may also comprise transforming non-position vertex data (varyings) appropriately. In embodiments, once vertex processing for a packet is completed, backend processing of the packet is performed.

The backend process processes packets to generate a set (e.g. hierarchy) of bounding boxes, and writes out (stores) information representative of the set (e.g. hierarchy) of bounding boxes. The backend process may process plural packets at the same time, e.g. in parallel. It would also be possible for the frontend process to generate plural packets at the same time, e.g. in parallel.

In embodiments, the (first processing circuit of the) graphics processor comprises one or more (e.g. plural) frontend circuits operable to generate packets (perform the frontend process), one or more (e.g. plural) backend circuits operable to process packets (perform the backend process), and an assigning circuit operable to assign a packet generated by a frontend circuit to a backend circuit for processing.

In embodiments, the e.g. backend process operates to cull primitives from further processing. The culling may comprise, for example, front/back-face culling, frustum culling, and/or sample aware culling, etc.

Both frontend and backend processes may be performed in hardware, e.g. by the geometry processing control unit (e.g. tiler). In embodiments, the frontend process is performed in hardware, e.g. by the geometry processing control unit (e.g. tiler), and the backend process is performed in software, e.g. by (the) one or more programmable execution units (e.g. shader cores) of the graphics processor executing an appropriate (e.g. shader) program.

The present invention can be implemented in any suitable system, such as a suitably configured micro-processor based system. In embodiments, the present invention is implemented in a computer and/or micro-processor based system. The present invention is in embodiments implemented in a portable device, such as, and in embodiments, a mobile phone or tablet.

The present invention is applicable to any suitable form or configuration of graphics processor and graphics processing system, such as graphics processors (and systems) having a "pipelined" arrangement (in which case the graphics processor executes a rendering pipeline).

In embodiments, the various functions of the present invention are carried out on a single data processing platform that generates and outputs data, for example for a display device.

As will be appreciated by those skilled in the art, the graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) execution unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The present invention can be used for all forms of input and/or output that a graphics processor may use or generate. For example, the graphics processor may execute a graphics processing pipeline that generates frames for display, render-to-texture outputs, etc. The output data values from the processing are in embodiments exported to external, e.g. main, memory, for storage and use, such as to a frame buffer for a display.

The various functions of the present invention can be carried out in any desired and suitable manner. For example, the functions of the present invention can be implemented in hardware or software, as desired. Thus, for example, the various functional elements, stages, and "means" of the present invention may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the present invention may be duplicated and/or carried out in parallel on a given processor. Equally, the various processing stages may share processing circuit(s), etc., if desired.

Furthermore, any one or more or all of the processing stages of the present invention may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the present invention may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the present invention can include, as appropriate, any one or more or all of the optional features described herein.

The methods in accordance with the present invention may be implemented at least partially using software e.g.

computer programs. It will thus be seen that when viewed from further embodiments the present invention provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . .

The present invention also extends to a computer software carrier comprising such software which when used to operate a data processor, renderer or other system comprising a data processor causes in conjunction with said data processor said processor, renderer or system to carry out the steps of the methods of the present invention. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the present invention need be carried out by computer software and thus from a further broad embodiment the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

Figure 2:
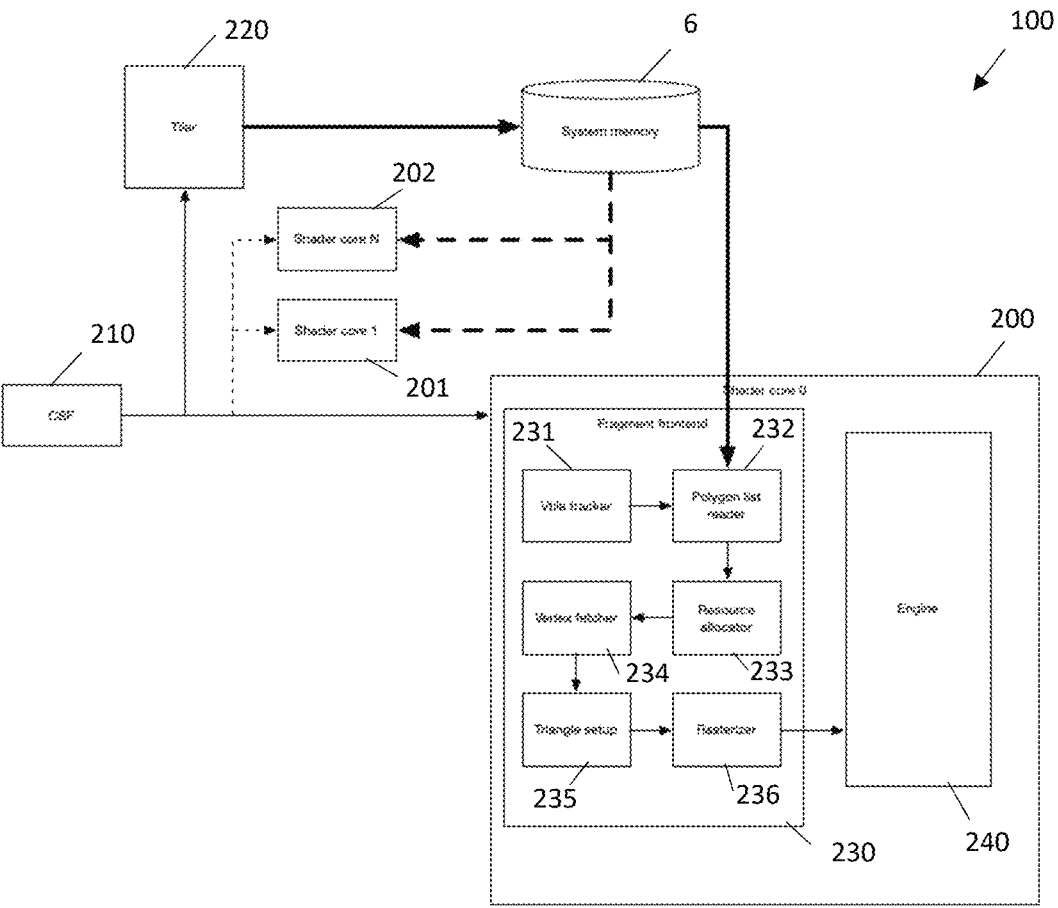
Figure 3:
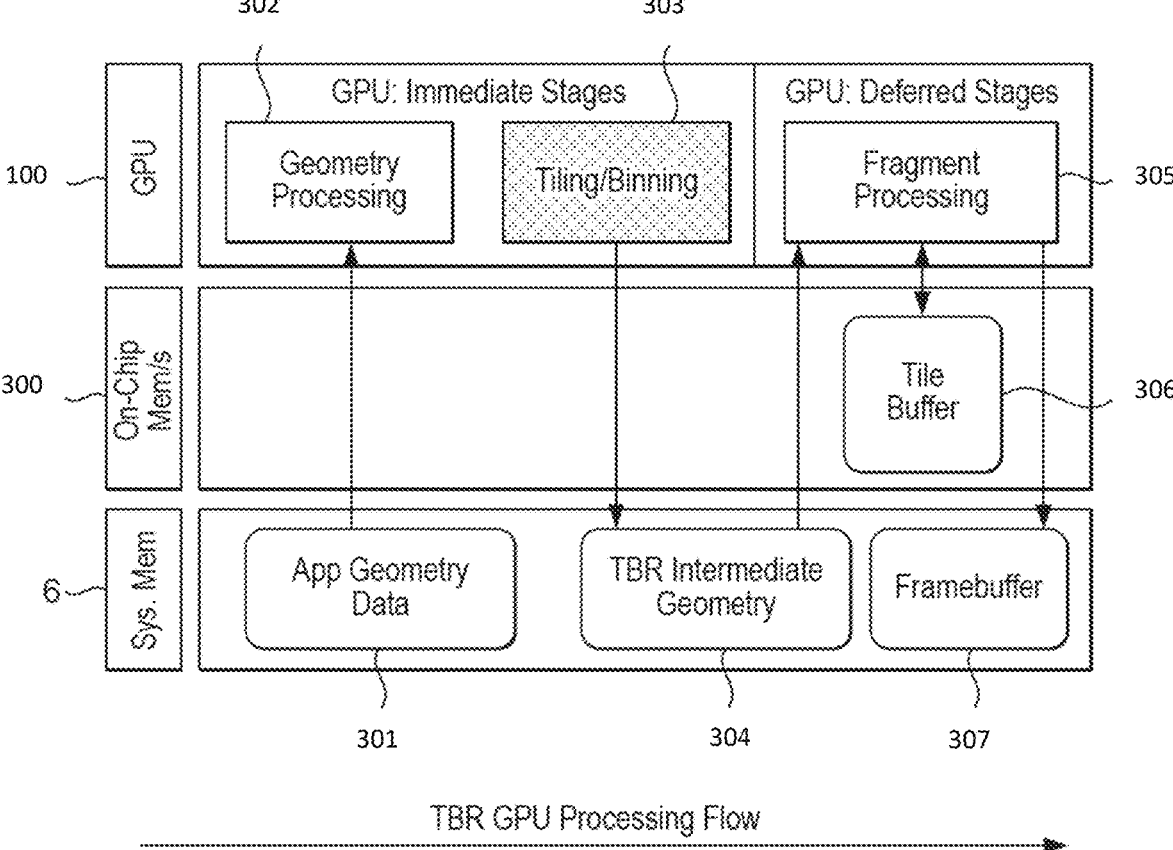
Figure 4:
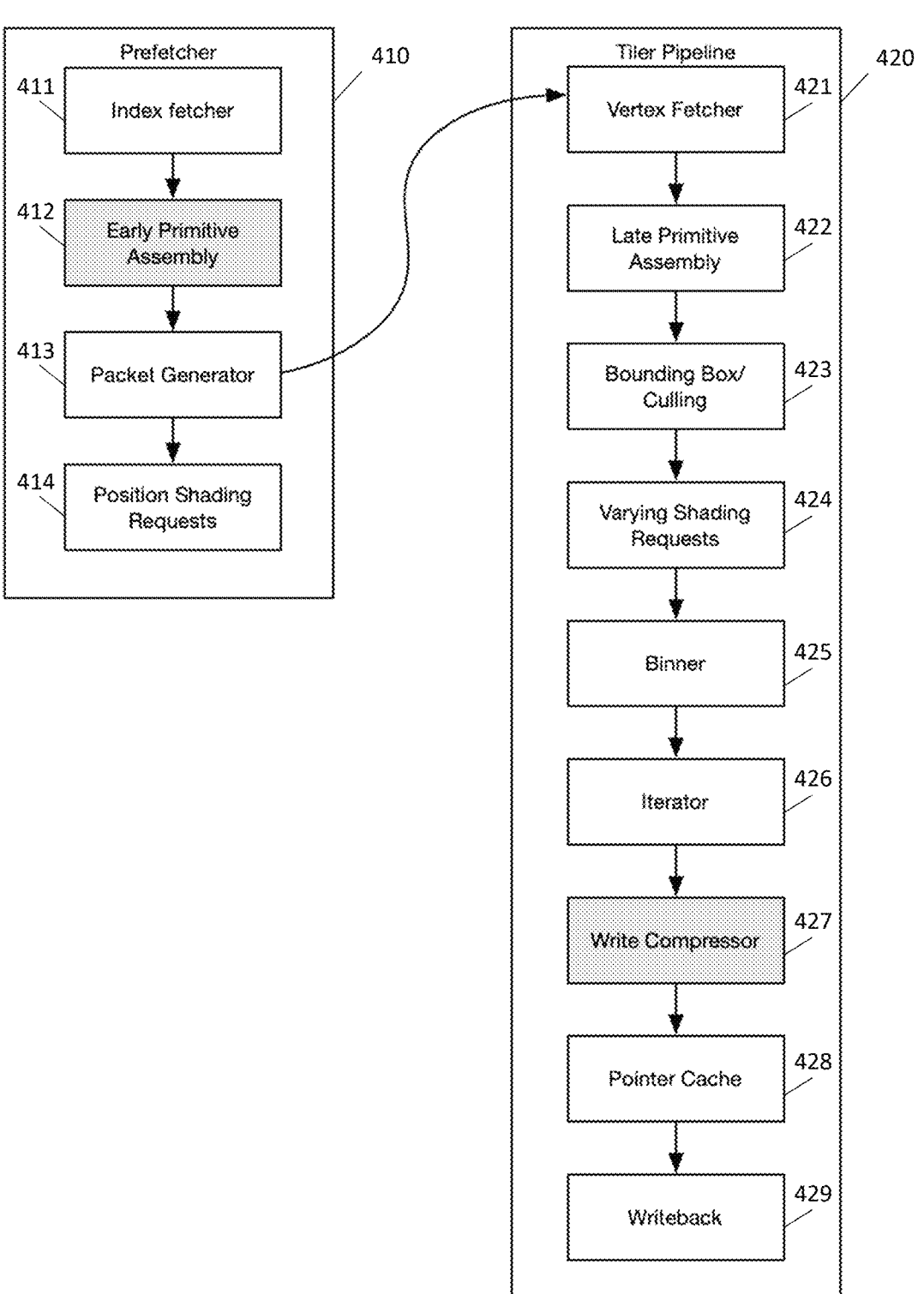
Figure 5:
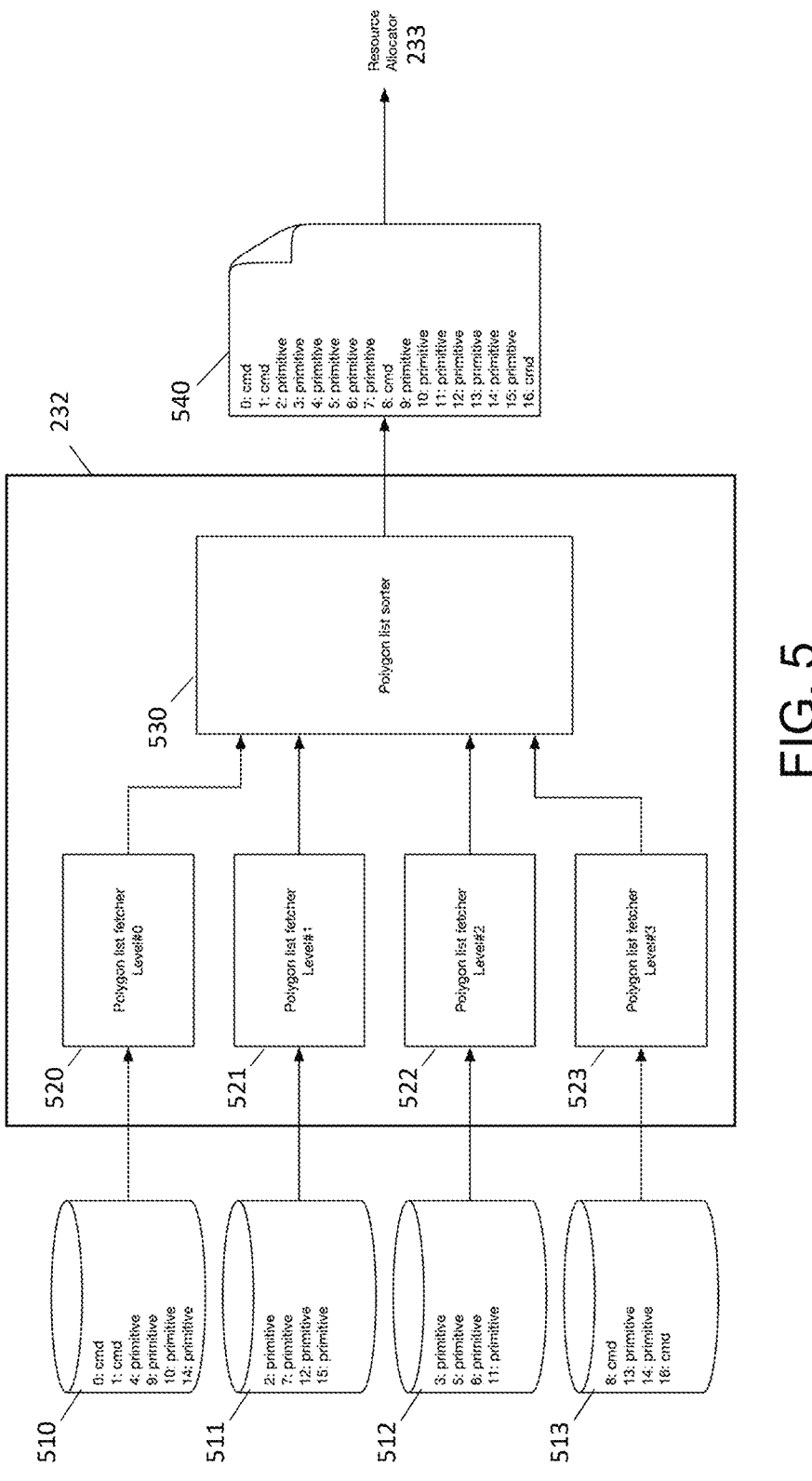
Figure 6:
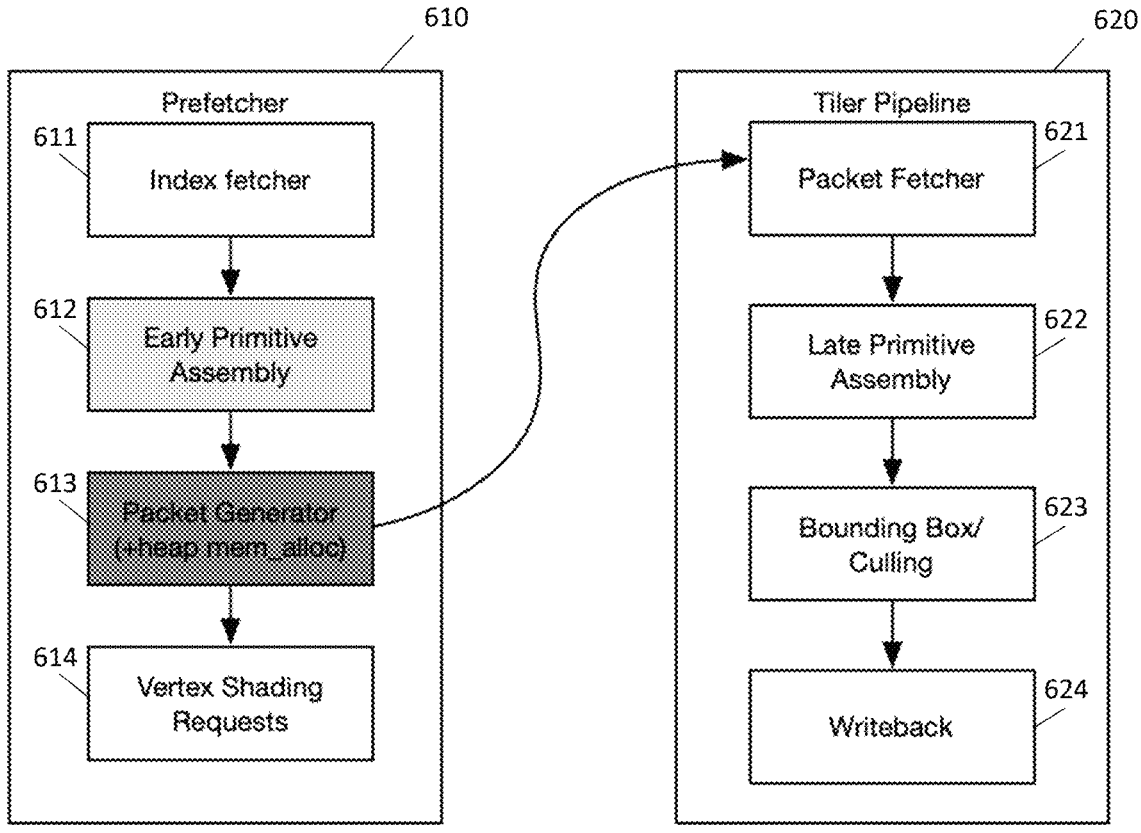
Figure 7:
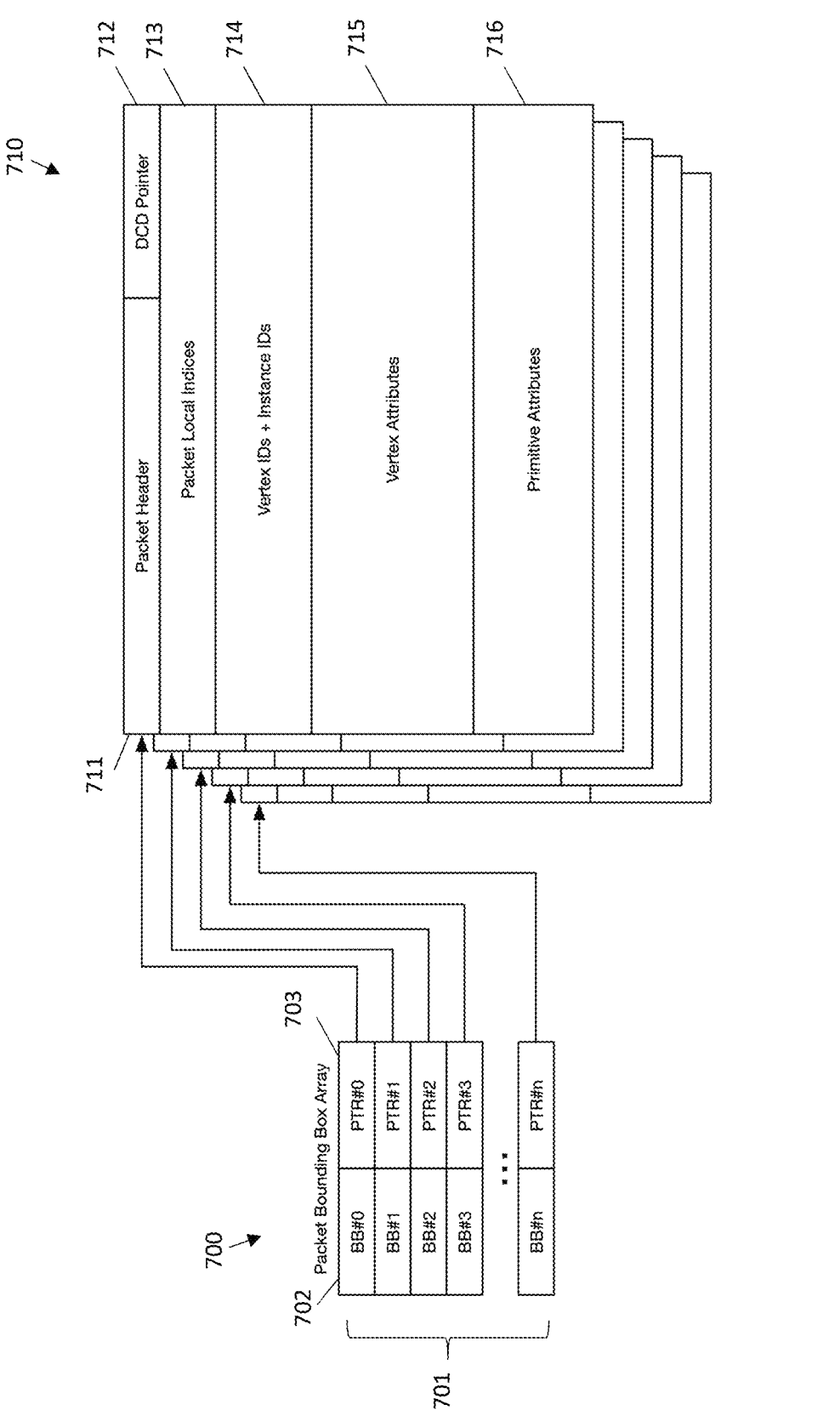
Figure 8:
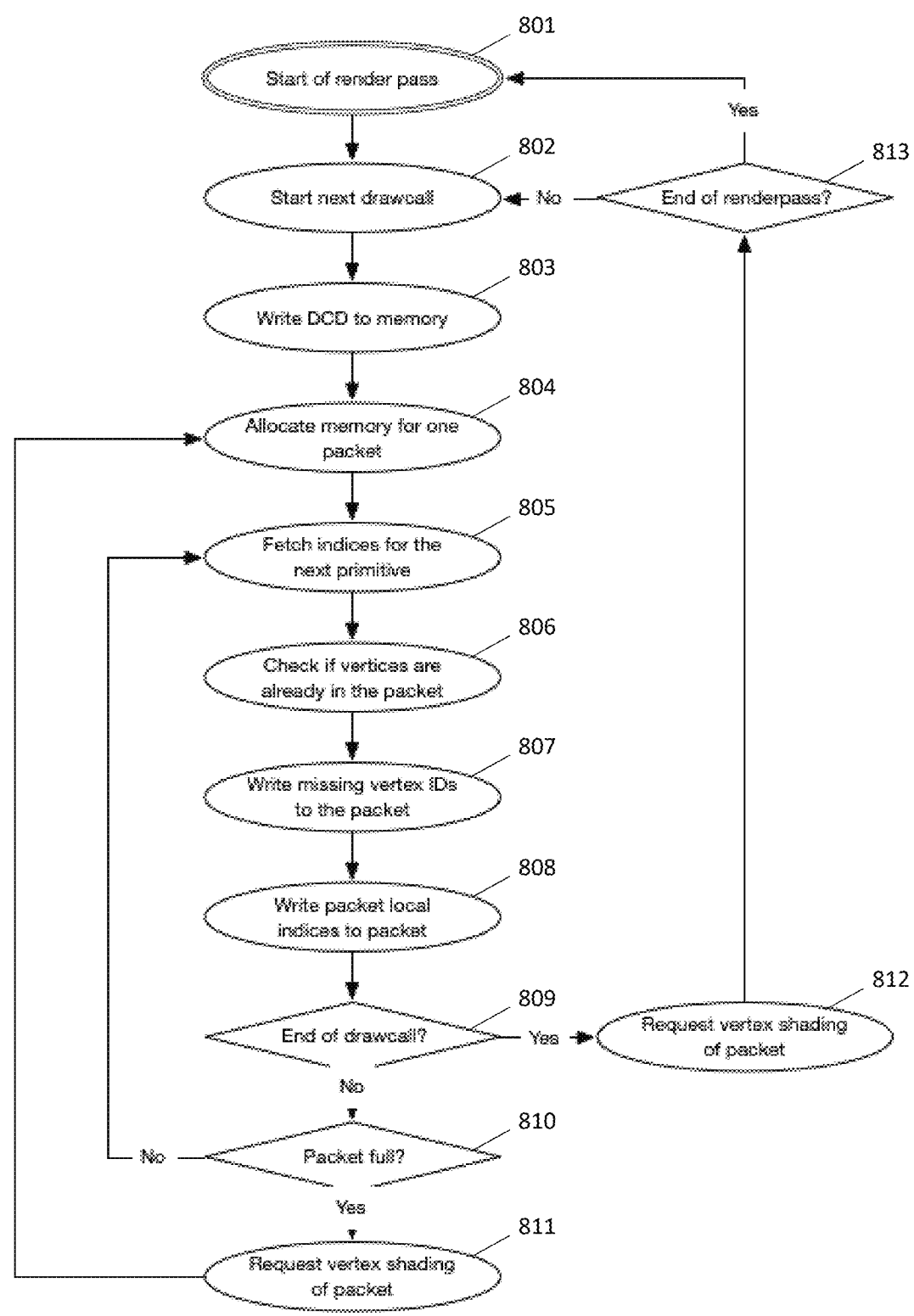
Figure 9:
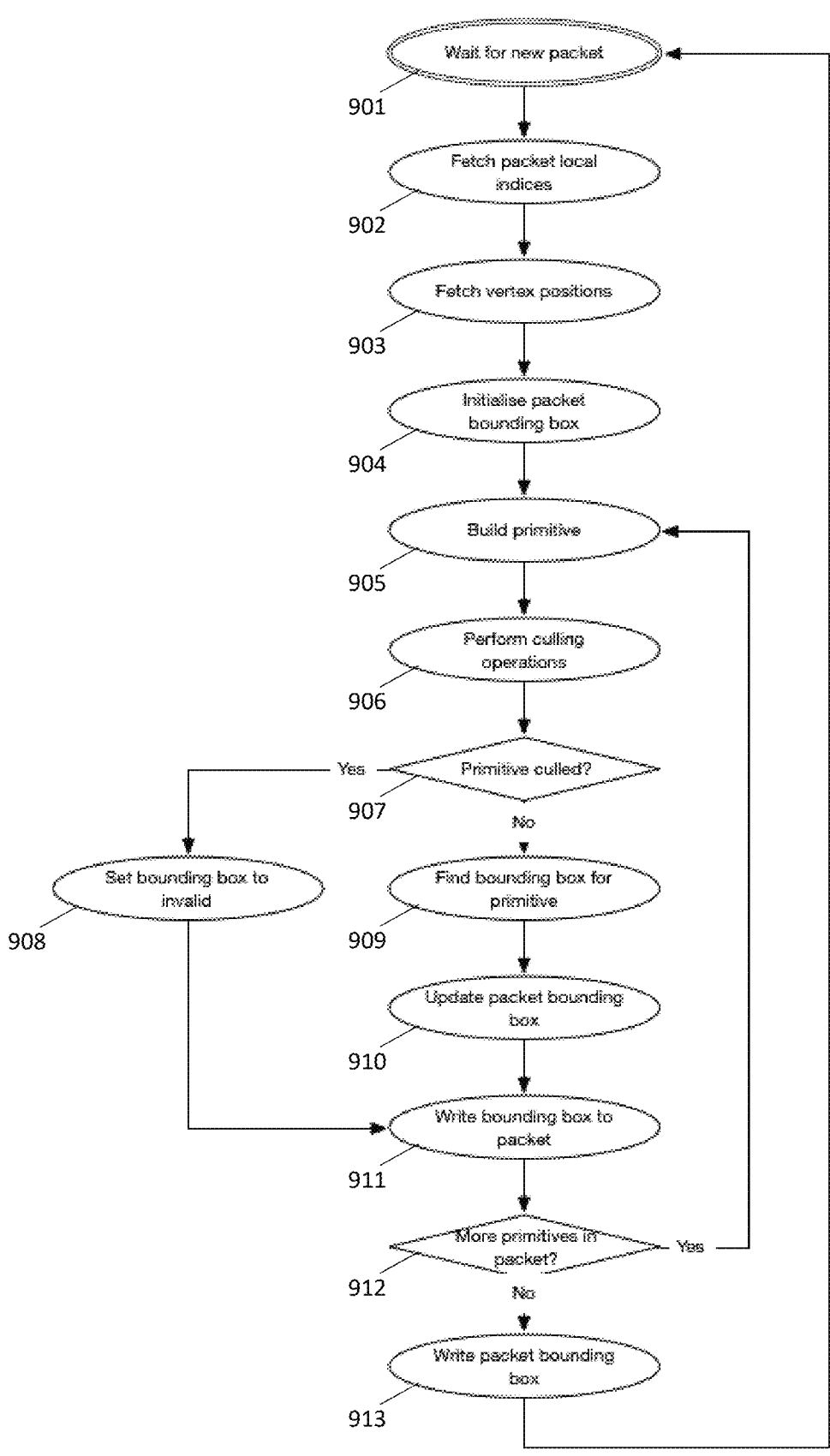
Figure 10:
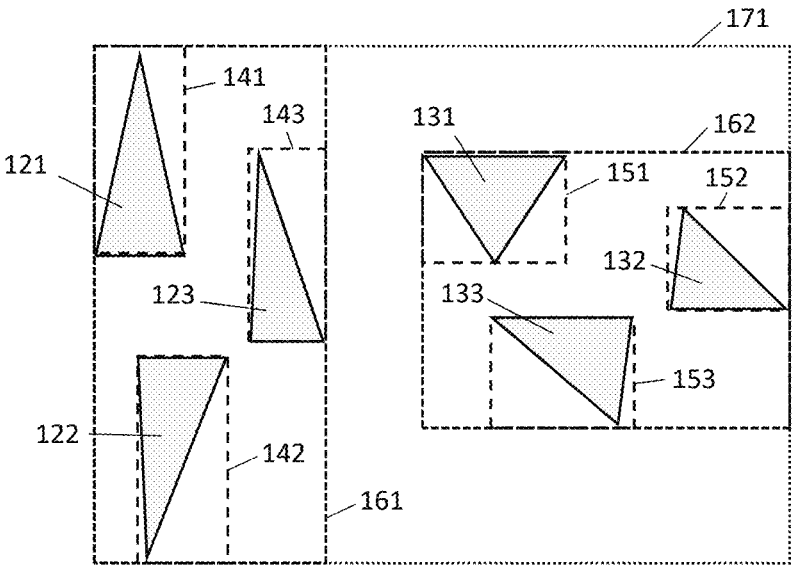
Figure 11:
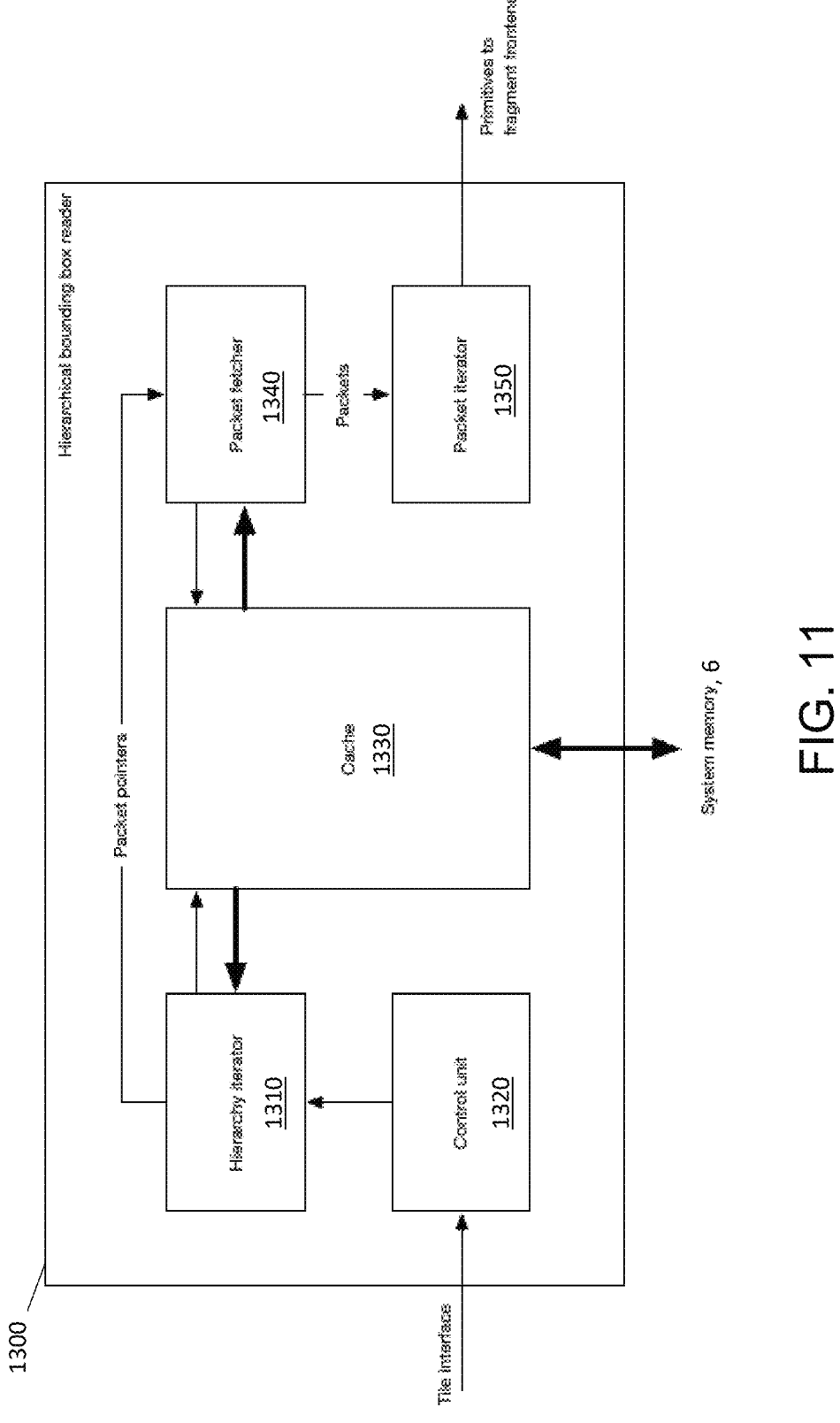
Figure 12:
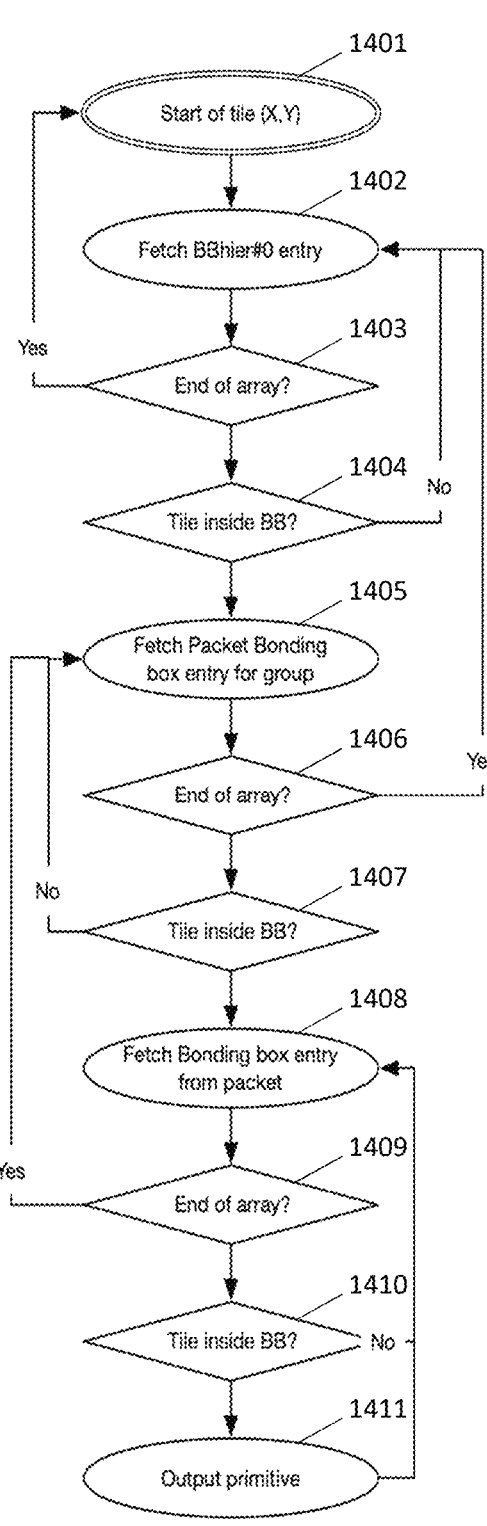
Figure 13:
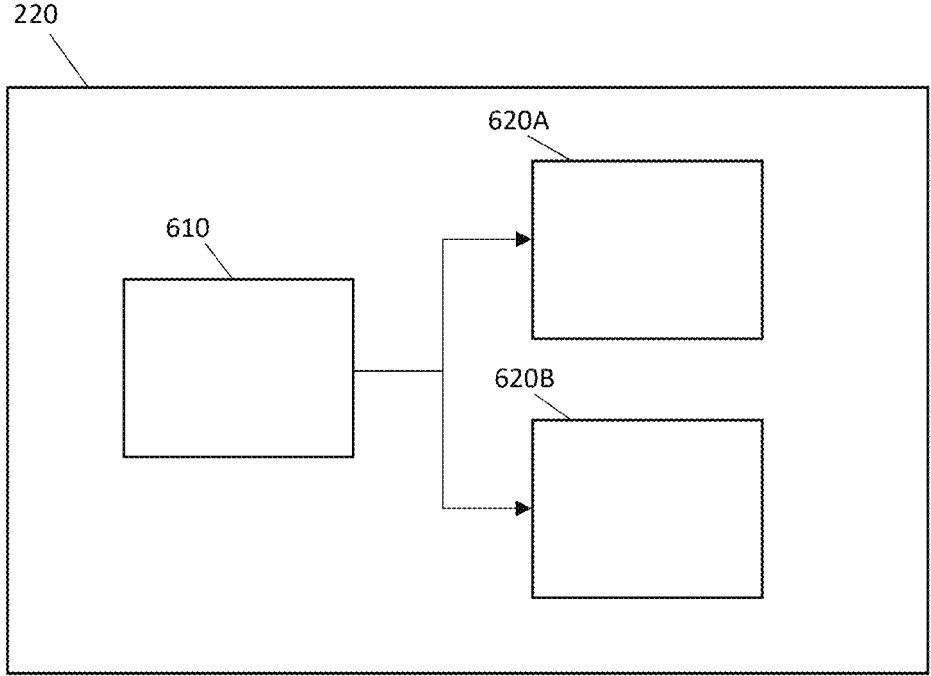
Figure 14:
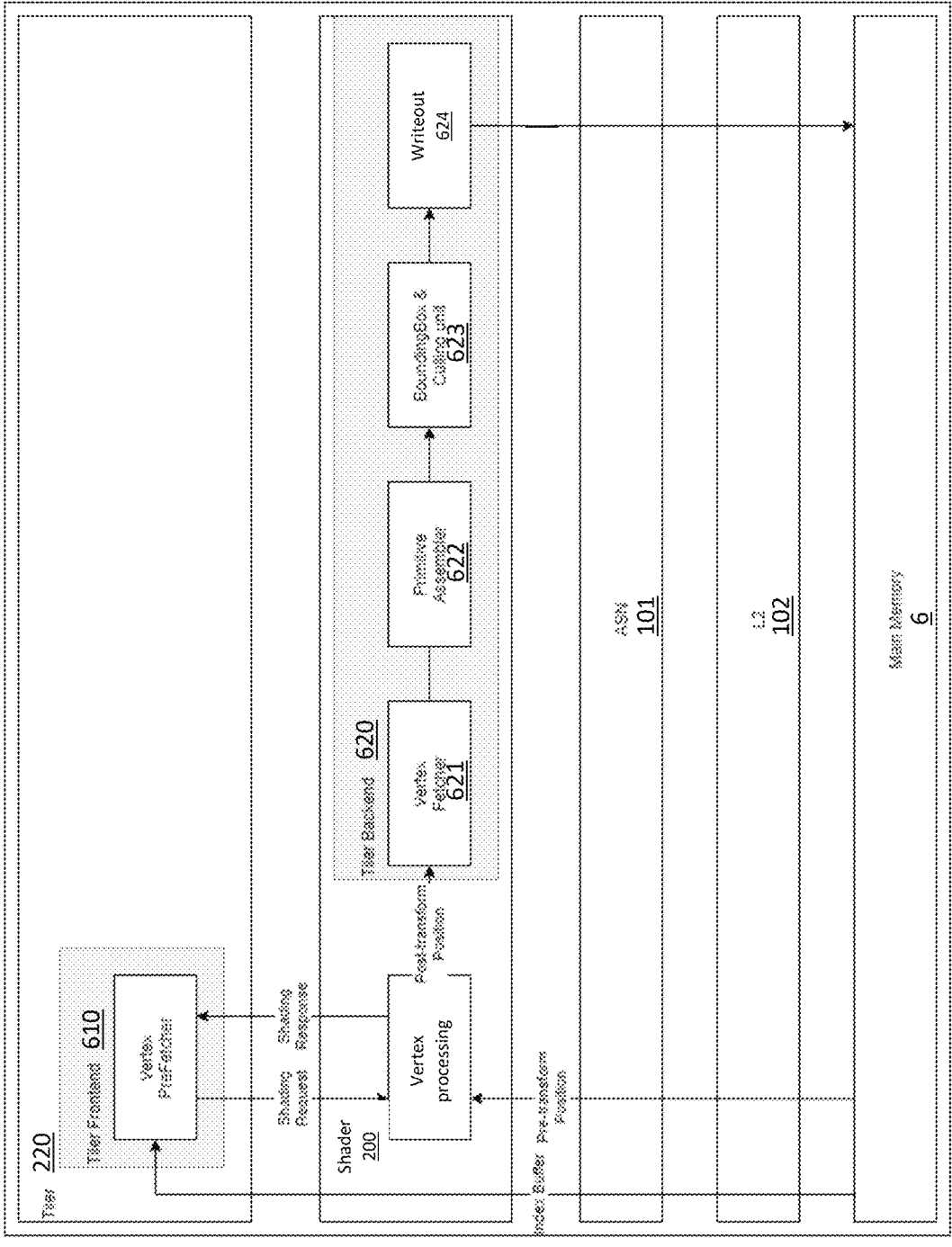
Figure 15:
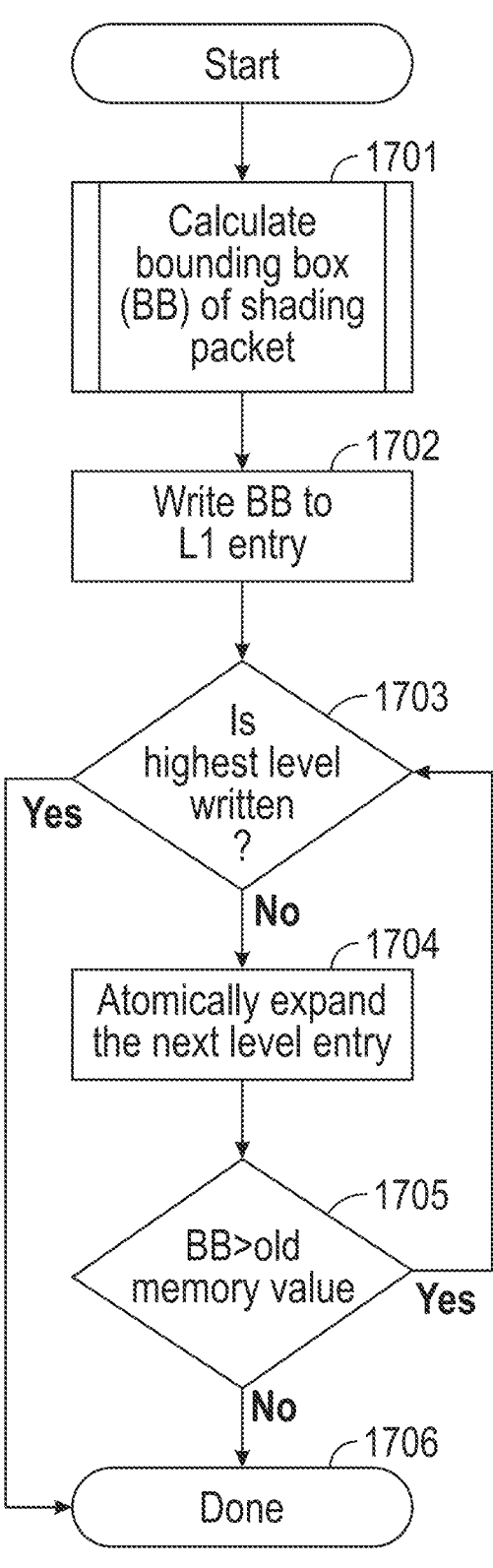
Figure 16:
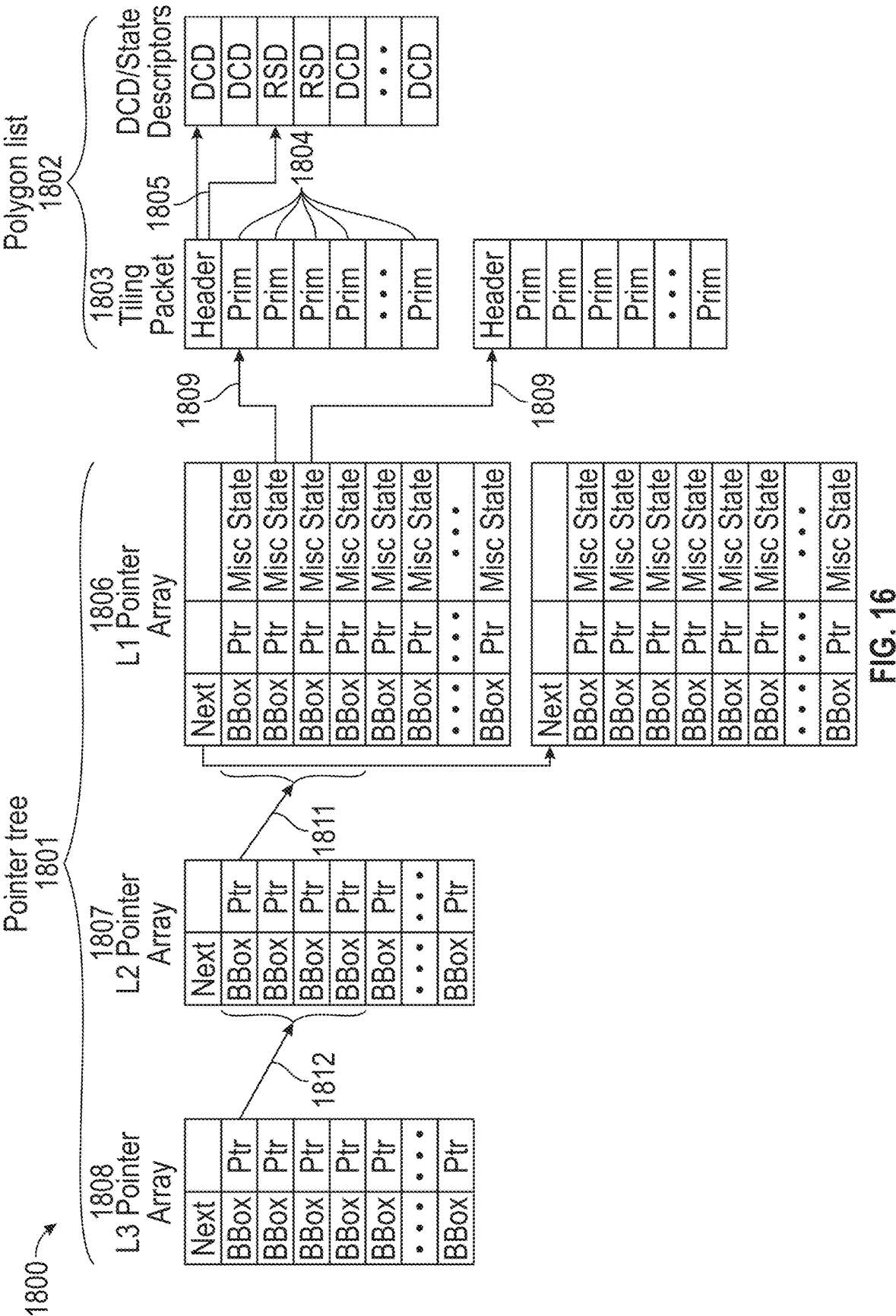

Embodiments of the present invention will now be described by way of example only and with reference to the accompanying drawings, in which:

FIG. 1 shows an exemplary graphics processing system;
FIG. 2 shows an exemplary tile-based graphics processor;

FIG. 3 shows an exemplary tile-based graphics processing pipeline;
FIG. 4 shows a packetized tile-based graphics processing pipeline;
FIG. 5 shows an exemplary primitive list reader of a tile-based graphics processor;
FIG. 6 shows a tile-based graphics processing pipeline according to embodiments of the present invention;
FIG. 7 shows a memory layout in accordance with embodiments of the present invention;
FIG. 8 shows a frontend process according to embodiments of the present invention;
FIG. 9 shows a backend process according to embodiments of the present invention;
FIG. 10 shows a hierarchy of bounding boxes in accordance with embodiments of the present invention;
FIG. 11 shows a hierarchical bounding box reader of a tile-based graphics processor in accordance with embodiments of the present invention;
FIG. 12 shows a bounding box hierarchy reading process in accordance with embodiments of the present invention;
FIG. 13 shows a tiler unit in accordance with embodiments of the present invention; and
FIG. 14 shows a tile-based graphics processing pipeline according to embodiments of the present invention;
FIG. 15 shows a bounding box hierarchy process in accordance with embodiments of the present invention;
FIG. 16 shows a hierarchy of bounding boxes in accordance with embodiments of the present invention.

As discussed above, embodiments of the present invention relate to a rasterisation-based tile-based graphics processor that, in a first processing pass, writes out bounding box information, and then in a second processing pass, uses the bounding box information to determine which primitives to process (rasterise and render) for which rendering tiles.

FIG. 1 shows an exemplary graphics processing system in which the embodiments of present invention may be implemented.

The exemplary graphics processing system shown in FIG. 1 comprises a host processor comprising at least one central processing unit (CPU) 1, a graphics processor (graphics processing unit (GPU)) 100, a video codec 2, a display controller 3, and a memory controller 4. As shown in FIG. 1, these units communicate via an interconnect 5 and have access to an off-chip memory system (memory) 6. In this system, the graphics processor 100, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processor 100 that is executing on the at least one CPU 1. The driver 9 will then generate appropriate commands and data to cause the graphics processor 100 to render appropriate frames for display and store those frames in appropriate frame buffers, e.g. in main memory 6. The display controller 3 will then read those frames into a buffer for the display from where they are then read out and displayed on the display panel of the display 7.

FIG. 2 shows a typical tile-based graphics processor 100 in more detail. As shown in FIG. 2, the tile-based graphics processor 100 includes a command stream frontend (CSF) 210, a tiler (geometry processing control unit) 220, and a set of shader cores 200, 201, 202. FIG. 2 illustrates one of the shader cores 200 in greater detail than the others 201, 202, but each shader core of the graphics processor 100 has substantially the same configuration.

The command stream frontend 210 receives commands and data from the driver 9 (directly, or via data structures in memory), and distributes subtasks for execution to the tiling unit 220 and to the shader cores 200, 201, 202 appropriately.

In a tile-based rendering system the render output (e.g. frame for display) is divided into a plurality of tiles for rendering. Typically, each tile is 16×16, 32×32, or 64×64 data elements (sampling positions) in size, with the render output being divided into however many such tiles as are required for the render output size and shape that is being used. The tiles are rendered separately to generate the render output. To do this, for each draw call that is received to be processed, the tile-based graphics processor 100 operates to sort the primitives (polygons) for the draw call according to which tiles they should be processed for.

In order to facilitate this, in a typical tile-based graphics processor, the tiling unit 220 is operable to perform a first processing pass in which lists of primitives to be processed for different regions of the render output are prepared. These "primitive lists" (which can also be referred to as "tile lists" or "polygon lists") identify the primitives to be processed for the region in question.

The tiling unit 220 of FIG. 2 is a hierarchical tiler. Thus, as well as the render output being divided into tiles for rendering purposes, the render output is also, in effect, divided into plural sets of progressively larger sub-regions for which separate (different) primitive lists can be and are prepared by the tiling unit 220. The render output is, in effect, overlaid with a progressively increasing hierarchy of render output sub-divisions that the tiling unit 220 can prepare primitive lists for.

In the present example, the tiling unit 220 lists a primitive at only one level of the hierarchy, and selects the hierarchy level at which to list primitives so as to (try to) minimise the number of primitive reads and writes that would be required to render the primitives. Other arrangements are possible. For example, a primitive may be listed at plural levels of the hierarchy. Alternatively, the tiler may be non-hierarchical, and thus may prepare primitive lists only for individual rendering tiles.

As part of this processing pass, the tiler 220 and/or command stream frontend (CSF) 210 may assemble primitives from vertex data, and request vertex processing tasks to be performed by the set of shader cores 200, 201, 202 to generate processed (transformed) vertex data that the tiling unit 220 uses to prepare primitive lists. This "vertex shading" operation may comprise, for example, transforming vertex position attributes from the model space that they are initially defined for to the screen space that the output of the graphics processing is to be displayed in.

Once vertex processing and tiling has been completed, the transformed geometry and the primitive lists are written back to the main memory 6, and the first processing pass is complete.

A second processing pass is then performed for the render output, wherein each of the rendering tiles is rendered separately.

In this processing pass, the fragment frontend 230 of a shader core 200 receives fragment processing tasks from the command stream frontend (CSF) 210, and in response, tile tracker 231 schedules the rendering work that the shader core needs to perform in order to generate a tile. Primitive list reader 232 then reads the appropriate primitive list(s) for that tile from the memory 6 to identify the primitives that are to be rendered for the tile.

Resource allocator 233 then configures various elements of the graphics processor 100 for rendering the primitives that the primitive list reader 232 has identified are to be rendered for the tile. For example, the resource allocator 233 may appropriately configure a local tile buffer for storing output data for the tile being rendered.

Vertex fetcher 234 then reads the appropriate processed (transformed) vertex data for primitives to be rendered from the memory 6, and provides the primitives (i.e. their processed vertex data) to triangle set-up unit 235. The triangle set-up unit 235 performs primitive setup operations to setup the primitives to be rendered. This includes determining, from the vertices for the primitives, edge information representing the primitive edges. The edge information for the primitives is then passed to the rasteriser 236.

When the rasteriser 236 receives a graphics primitive for rendering (i.e. including its edge information), it rasterises the primitive to sampling points and generates one or more graphics fragments having appropriate positions (representing appropriate sampling positions) for rendering the primitive.

Fragments generated by the rasteriser 236 may then be subject to "culling" operations, such as depth testing, to see if any fragments can be discarded (culled) at this stage. Execution threads are then issued to execution engine 240 for processing fragments that have survived the culling stage.

The execution engine 240 executes a shader program for each execution thread issued to it to generate appropriate render output data, including colour (red, green and blue, RGB) and transparency (alpha, a) data. The rendering engine 240 may perform fragment processing (rendering) operations such as texture mapping, blending, shading, etc. on the fragments. Output data generated by the execution engine 240 is then written appropriately to the tile buffer.

Once a tile has been processed, its data is exported from the tile buffer to the main memory 6 (e.g. to a frame buffer in the main memory 6) for storage, and the next tile is then processed, and so on, until sufficient tiles have been processed to generate the entire render output (e.g. frame (image) to be displayed). The next render output (e.g. frame) may then be generated, and so on.

FIG. 3 shows schematically the typical tile-based rendering process. As shown in FIG. 3, in the first processing pass, the required geometry data 301 for a draw call is read from the external memory system 6 into the graphics processor 100. The primitive vertices are thus obtained and the geometry processing 302 (vertex shading) is performed in order to generate a corresponding set of post-transformed geometry data (e.g. transformed vertices) 304.

The transformed geometry is subject to a tiling operation 303 by the tiling unit 220 of the graphics processor 100, wherein it is determined for each of the primitives which rendering tiles the primitives should be processed for. The tiling unit may also operate to cull primitives that are outside of the view frustrum, or are back facing. In this way, respective primitive lists are generated that indicate which primitives are to be rendered for which of the rendering tiles.

Once all of the geometry processing for the render output has completed, and the tiling operating has completed, the transformed geometry 304 is written back to the external memory system 6 together with the primitive lists, and the first processing pass is complete.

The second processing pass is then performed wherein each of the rendering tiles is rendered (separately) in turn. Thus, for each rendering tile, it is determined from the respective primitive list(s) which primitives should be processed for that tile, and the associated transformed geometry data 304 for those primitives is read back in from memory 6 and subject to fragment processing 305 to generate the render output.

As shown in FIG. 3, the rendering is performed using a tile buffer 306 that resides in on-chip memory 300. Thus, the rendering of a given tile is performed locally to the graphics processor 100. Once the rendering for the tile has complete, the rendered data is then written out to the external memory 6, e.g. into a frame buffer 307, e.g. for display.

FIG. 4 illustrates an example of the tiling process 303 performed by the tiler 220 in which vertex processing is "packetized", e.g. substantially as described in United Kingdom Patent Application No. 2217231.6.

As shown in FIG. 4, the tiling operation is performed in a pipelined manner. In this example, the pipeline includes a prefetcher pipeline 410 ("frontend") that generates vertex packets and triggers vertex position shading operations in respect of generated vertex packets, and a tiler pipeline 420 ("backend") that generates primitive lists using the vertex packets generated by the prefetcher pipeline 410.

As shown in FIG. 4, prefetcher pipeline 410 includes index fetcher 411 which fetches and outputs a sequence (stream) of indices from a stored vertex index array defined and provided for the render output being generated, and provides the sequence of indices to early primitive assembly stage 412. Early primitive assembly stage 412 assembles complete primitives from the stream of indices in accordance with primitive configuration information that defines the type of primitives to be assembled (e.g. whether the assembled primitives are to be in the form of triangles, triangle strips, triangle fans, points or lines, etc.), and outputs a sequence of complete assembled primitives to packet generation stage 413.

The packet generation stage 413 operates to generate vertex packets comprising vertices of assembled primitives. The packet generation stage 413 allocates vertices of assembled primitives that are received from the earlier primitive assembly 412 to a respective vertex packet(s) in turn.

In the present example, each vertex packet has a maximum permitted capacity of vertices, such as 64 vertices, and once that capacity is reached, a new vertex packet is started. Once a vertex packet has been filled up, vertex shading of position attributes for the vertices that have been included in the vertex packet is requested 414. The position shading for a vertex packet is performed by the shader cores 200 executing an appropriate shader program, and generates and stores in memory 6 a vertex packet comprising the vertex shaded (transformed) positions for the vertices of the vertex packet.

Once the vertex packets, including the transformed vertex positions for the vertices of the vertex packets have been generated and stored in memory, they can then be used when and for processing the assembled primitives.

As shown in FIG. 4, packet fetcher 421 loads vertex packets (when they are ready) from memory 6 (where they will have been stored following the position shading triggered by the vertex packet generation stage 413) into a vertex buffer for use by late primitive assembly stage 422. The packet fetcher 421 is configured to load vertex packets into the vertex buffer as they are required and ready, and, correspondingly, to evict vertex packets from the vertex buffer (to provide room for new vertex packets) when they are no longer required in the vertex buffer.

Late primitive assembly stage 422 associates each assembled primitive in sequence with the corresponding transformed positions for the vertices for the primitive in question from the vertex buffer, and accordingly outputs a corresponding sequence of assembled primitives, which primitives, at this stage, now each comprise a primitive identifier and a sequence of shaded (transformed) positions for the primitives in the sequence. The so-assembled primitives are then sent to the next stage of the tiling process for tiling.

The tiling process can be carried out at varying levels of precision. For example, at the most precise level, it could be determined exactly which tiles a given primitive will appear at least in part in, and the primitive then included in the primitive lists for those tiles only. This is commonly referred to as "exact" tiling. The present example uses a "less precise" tiling technique, known as "bounding box" tiling. In this case, a bounding box is drawn around a primitive, and then the tiles covered by the bounding box are determined. The primitive that the bounding box represents (i.e. that is encompassed by the bounding box) is then listed (binned) for each tile that the bounding box has been found to cover (at least in part), and the bounding box is then discarded. This can simplify the preparation of the primitive lists, e.g. as compared to "exact" tiling.

Thus, as shown in FIG. 4, bounding box generation stage 423 generates appropriate bounding boxes for the assembled primitives, and also operates to identify any primitives that can be culled from further processing on the basis of their (potential) visibility. This culling may comprise, for example, front/back-face culling, frustum culling, and/or sample aware culling, etc.

The bounding box generation uses the provided positions for the assembled primitives to generate appropriate bounding boxes for the primitives. In the present example, bounding boxes at the resolution of the individual tiles that the output is divided into for rendering purposes are used, but other arrangements would be possible.

The output from the culling and bounding box generation comprises for each primitive an identifier for the primitive, a set of vertex indices for the primitive, and bounding box information for the primitive (in the present case in the form of which rendering tile or tiles the primitive falls within).

The primitives with their bounding boxes are then passed to the next stage 424 which triggers vertex attribute processing (vertex shading) for any remaining (non position) attributes (varyings) of vertices belonging to primitives that have passed the culling process. Again, this further vertex shading is performed by the shader cores 200 executing an appropriate shader program. The processed other vertex attributes (varyings) are added appropriately to the generated vertex packets, such that the vertex packets then store both the transformed positions and other processed vertex attributes (varyings) for the vertices that they relate to.

The primitives with their bounding boxes are then passed to the binning stage 425 and hierarchical iteration stage 426, which operate to identify using the bounding boxes for the primitives which primitive lists the primitives should be listed in (by comparing the bounding boxes for the primitives with the respective primitive list regions), and to output the primitive lists.

Compression stage 427 compresses the generated primitive lists, and the primitive lists are written 429 to memory 6 in compressed form, together with appropriate pointer information 428. As discussed above, once the primitive lists have been written out, they may be read and used in a subsequent fragment processing pass to generate respective tiles of the overall render output. In the present example, these "fragment stages" start with a primitive (polygon) list reader stage reading the primitive lists.

FIG. 5 illustrates schematically the operation of the primitive list reader 232. As shown in FIG. 5, the primitive list reader 232 reads in the primitive lists 510-513 written out to memory 6 by the writeout stage 429.

In the present example, the tiler 220 is a hierarchical tiler that prepares primitive lists for four hierarchy levels, and the primitive list reader 232 correspondingly includes a set of four list fetchers 520-523. Each list fetcher fetches from memory 6 the primitive list(s) relevant to the current rendering tile for a respective one of the hierarchy levels.

As shown in FIG. 5, the primitive list reader 232 further includes a primitive list merger 530 which operates to merge the primitive lists for the different hierarchy levels into a single list of primitives 540 to be processed for the current rendering tile. The merging is done so as to preserve the order in which the primitives were originally specified (within a draw call). As shown in FIG. 5, the merged primitive list 540 is passed to the resource allocator 233 for processing, e.g. as described above. The primitives may thus be rasterised and rendered appropriately.

The inventor has realised that in arrangements such as described above, the primitive lists must typically be generated and written out in serial order, e.g. so as to preserve the order in which the primitives are intended to be processed. This means that the primitive list writing process must typically operate in a serial fashion. This can create a performance "bottleneck" in the graphics processing pipeline, and can also hinder scaling to different tiling performance levels.

FIG. 6 illustrates a tiling process that may be performed by a tiling unit 220, in accordance with embodiments of the present invention. As shown in FIG. 6, as in the example described above, the pipeline includes a prefetcher pipeline 610 ("frontend") that generates packets and triggers vertex shading operations in respect of generated packets, and a tiler pipeline 620 ("backend") that processes the packets generated by the prefetcher pipeline 610. In embodiments, the tiler pipeline 620 ("backend") is implemented in hardware as, at least, part of, or associated with a respective programmable execution unit (e.g., shader core). Thus, in embodiments where there is a plurality of shader cores then each shader core of the plurality of shader cores may include a tiler pipeline 620 ("backend"). Each tiler backend can process a packet independently which advantageously decouples the prefetcher pipeline 610 ("frontend") and the tiler pipeline 620 ("backend"). Furthermore, in embodiments utilising a hierarchical bounding box data structure enabling each packet to be processed and written independently by each tiler backend, this advantageously provides a significant performance enhancement by scaling core count.

The prefetcher pipeline 610 includes index fetcher 611 which fetches and outputs a sequence (stream) of indices from a stored vertex index array defined and provided for the render output being generated, and provides the sequence of indices to early primitive assembly stage 612. Early primitive assembly stage 612 assembles complete primitives from the stream of indices in accordance with primitive configuration information that defines the type of primitives to be assembled (e.g. whether the assembled primitives are to be in the form of triangles, triangle strips, triangle fans, points or lines, etc.), and outputs a sequence of complete assembled primitives to packet generation stage 613.

The packet generation stage 613 operates to generate packets comprising vertices of assembled primitives. The packet generation stage 613 allocates vertices and primitives that are received from the earlier primitive assembly 612 to a respective packet(s) in turn.

In the present embodiment, the packet generation stage 613 also allocates appropriate space in memory 6 for storing the packets. FIG. 7 illustrates a memory layout for a packet 710 that may be allocated by the packet generation stage 613, in accordance with embodiments. As illustrated in FIG. 7, in the present embodiment, each packet 710 includes header information 711 that includes a pointer to the draw call descriptor (DCD) 712 for the draw call that the packet represents. Each packet 710 further includes body information comprising identifiers 714 for the vertices that the packet contains, and indices 713 that reference the vertices to define the primitives that the packet contains. Each packet 710 further includes vertex attribute data 715 for the vertices that the packet contains, and primitive attribute data 716 for the primitives that the packet contains.

As illustrated in FIG. 7, in the present embodiment, the packet generation stage 613 also maintains an array 700 to keep track of the packets it has generated, and the order in which packets have been generated (for a particular drawcall/render output). As illustrated in FIG. 7, the packet array 700 includes a number of entries 701 that each include a respective pointer 703 pointing to the respective packet 710 in memory 6. Each entry 701 also includes packet bounding box information 702, which will be described below.

In the present embodiment, each packet has a maximum permitted number of vertices, e.g. 64, 128 or 256 vertices, and a maximum permitted number of primitives, e.g. 64, 128 or 256 primitives. A new packet is started once the maximum permitted number of vertices or the maximum permitted number of primitives is reached. Each time a new packet is started, the packet generation stage 613 allocates the next entry in the array 700, such that the order in which packets appear in the packet array 700 corresponds to the order in which the packets were generated.

Returning to FIG. 6, once a packet has been filled up, vertex shading of position attributes for the vertices that have been included in the vertex packet is requested 614.

FIG. 8 illustrates the process performed by the prefetcher pipeline 610 ("frontend"), according to embodiments. As illustrated in FIG. 8, the process is performed for each render output (e.g. frame) 801, and for each drawcall 802 for a render output. When a new drawcall is received for processing, a drawcall descriptor (DCD) is written 803 to memory 6. At step 804, memory space for a new packet 710 is allocated, and pointer information 712 pointing to the drawcall descriptor (DCD) is stored in the packet.

At step 805, index fetcher 611 fetches the indices defining the next primitive to be processed. At step 806, it is determined whether the vertices referred to by the indices are already present in the packet 710, and at step 807, identifiers for vertices 714 determined not to be already present in the packet are written to the packet 710, and then, at step 808, indices defining the primitive 713 are written to the packet 710.

The process of adding primitives and vertices to the current packet is repeated until the current packet is full, or until the end of the current drawcall. Thus, if at step 810, there is another primitive to process for the current drawcall, but the current packet is full, the packet is completed and vertex shading for the packet is requested 811, and a new packet is started 804. If, at step 809, the primitive is the last primitive in the current drawcall, the packet is completed and vertex shading for the packet is requested 812. If, at step 813, there is another drawcall to be processed for the current render output, the next drawcall is processed 802, or otherwise the next render output (e.g. frame) is processed 801.

In response to the vertex shading requests 614, 811, 812, the position shading for a vertex packet is performed by the shader cores 200 executing an appropriate shader program, which generates and stores the vertex shaded (transformed) positions 715 for the vertices of the vertex packet in the packet 710. Then, once the transformed vertex positions for the vertices of the packet have been generated and stored in the packet, they can then be processed by the tiler pipeline 620 ("backend") associated with, or incorporated as, at least, part of, the shader core 200.

As shown in FIG. 6, packet fetcher 621 loads packets from memory 6 when they are ready. Late primitive assembly stage 622 may associate each assembled primitive in sequence with the corresponding transformed positions for the vertices for the primitive in question from the vertex buffer, and store appropriate primitive attribute information 716 in the packet 710.

As shown in FIG. 6, bounding box generation stage 623 then generates appropriate bounding boxes for the assembled primitives of a packet, and also operates to cull primitives from further processing on the basis of their (potential) visibility. This culling may comprise, for example, front/back-face culling, frustum culling, and/or sample aware culling, etc.

The bounding box generation uses the provided positions for the assembled primitives to generate an appropriate, e.g. minimum, bounding box for each primitive defined by a packet 710. In the present embodiment, these "primitive bounding boxes" are stored with the primitive attribute information 716 in the packet 710. Alternatively, the primitive bounding boxes could be stored in a dedicated region (not shown) of the packet 710.

In the present embodiment, the bounding box generation stage 623 also generates for each packet, a "packet bounding box" that bounds all of the primitive bounding boxes within the packet 710. A packet bounding box may, for example, be generated by determining the maximum and minimum x and y values, i.e. x_min, x_max, y_min and y_max, and may therefore be defined as a four component vector, for the primitive bounding boxes within the packet in question. In the present embodiment, the packet bounding box for a packet is stored in the corresponding entry 702 of the packet array 700.

Once the primitive bounding boxes and the packet bounding boxes have been generated, they are written out 624 to memory 6. The bounding box information may be optionally compressed before being written out.

FIG. 9 illustrates the process performed by the tiler pipeline 620 ("backend"), according to embodiments. As illustrated in FIG. 9, when the position shading for packet 710 is complete 901, packet fetcher 621 fetches primitive 902 and vertex 903 information for the packet 710, and initialises 904 a packet bounding box for the packet 710. Late primitive assembly stage 622 builds a primitive 905, and bounding box/culling stage 623 performs culling operations 906 on the primitive.

If, at step 907, the primitive is culled, bounding box information for the primitive may be set to invalid 908, and an indication that the bounding box for the primitive is invalid may be written 911 to primitive attribute information 716 of the packet 710. If the primitive survives culling, bounding box/culling stage 623 generates a bounding box for the primitive 909, and the generated primitive bounding box is used to update the packet bounding box 910, and is written 911 to primitive attribute information 716 of the packet 710.

The process of primitive building, culling and bounding box generation is repeated for all of the primitives within the current packet. Thus, if at step 912 there is another primitive in the current packet, the next primitive is built 905, and so on. Once all of the primitives of the current packet have been processed, the packet bounding box is written 913 to the appropriate entry 702 of the packet array 700, and the next packet is processed 901, and so on.

As illustrated in FIG. 14, in this embodiment, tiler frontend 610 of tiler 220 uses vertex indices received from memory 6 to assemble primitives and generate packets, and issues requests for vertex processing of packets to shader cores 200. In response to the requests, shader cores 200 read in vertex data from memory 6, and execute vertex shading programs to transform the vertex data. The shader cores 200 may execute one thread per vertex, e.g. in parallel.

When vertex processing for a packet is completed, shader cores 200 perform the tiling backend process 620 for the packet. Thus, the transformed vertex data 621 for a packet is used to assemble primitives 622, culling and bounding box generation 623 is performed, and then bounding box information is written out 624.

The shader cores 200 may execute one thread per primitive, e.g. in parallel, to generate a primitive bounding box for each primitive in a packet. A barrier may be used to wait for threads to complete, and then a packet bounding box may be generated by iterating over all primitive bounding boxes. Then, once all packets for the drawcall/render output have been generated, a bounding box hierarchy building shader call may be issued, and executed by the shader cores 200, to build further bounding box hierarchy levels. The bounding box hierarchy building shader may iterate over the packet bounding box array, group a predefined number of packet bounding boxes, and write a bounding box to the higher hierarchy level. Then, when the bounding box hierarchy building shader has completed, the fragment processing pass is performed.

Since, in this embodiment, the transformed vertex data is generated by, and subsequently processed by, shader cores 200, the transformed vertex data may remain in the L2 cache 102, and the need for the transformed vertex data to be written out to memory 6 and then read back into the tiler 220 at the start of the backend process 620 can be avoided. This can accordingly reduce memory bandwidth requirements. Furthermore, this can reduce the complexity, and thus silicon area requirements, of the tiler 220. This embodiment can accordingly facilitate a low-cost tile-based graphics processor.

In the above embodiments, the tiler frontend process 610 may allocate the maximum possible amount of memory space to store the maximum possible number of vertices and primitives for a packet 710. However, if primitives are culled at the culling stage 623 of the backend process 620, the actual memory requirements for a packet may be reduced. Once all of the packets for a render output (e.g. frame) have been processed, a packet array 700 and processed packets 710 for the render pass will be stored in memory 6, with each packet 710 comprising a primitive bounding box for each primitive contained within the packet, and the packet array 700 comprising a packet bounding box for each packet for the render output. The output of the tiler pipeline ("backend") process is thus, in effect, a "hierarchy" of bounding boxes: a "lowest" hierarchy level comprising a primitive bounding box for each primitive, and a "higher" hierarchy level comprising a packet bounding box for each packet.

The first (geometry/tiling) processing pass may conclude at this point, with the second (fragment) processing pass then using the output bounding box hierarchy information to render rendering tiles. However, in the present embodiment, one or more further bounding box hierarchy levels are generated prior to the second (fragment) processing pass. Further levels of the bounding box hierarchy may be built by the shader cores 200 executing an appropriate shader program, for example.

FIG. 15 illustrates the process performed by the tiler pipeline 620 ("backend") associated with the prefetcher pipeline 610 ("frontend") to generate the hierarchical bounding box structure, according to one or more embodiments. As illustrated in FIG. 15, the tiler backend calculates a first bounding box for all visible primitives in the packet 1701, where the bounding box is defined as a four-component vector x_min, x_max, y_min, and y_max and is written 1702 to a level 1 entry of the hierarchical bounding box data structure.

Each tiler backend may write the calculated first bounding box to a level 1 of the hierarchical bounding box data structure safely, as a single tiler backend will write a level 1 bounding box. As the hierarchical bounding box data structure may include multiple levels then the plurality of tiler backends, independently processing packets, will impact upon the level 2, and additional levels, of the hierarchical bounding box data structure. An entry at a level higher, e.g. level 2, may therefore cover multiple entries at the next lower level, e.g. level 1. One option would be to have a further, separate, post-processing stage (e.g. a shading stage performing, for example, a compute job) to generate the hierarchical bounding box data structure, which is executed after all of the plurality of tiler backends have the first bounding box for all visible primitives in the packet. This option would avoid concurrency issues between the plurality of tiler backends but would be sub-optimal from a performance point of view since a separate shading stage would be required.

Thus, in preferred embodiments, the hierarchical bounding box data structure is generated utilising a pointer tree during the processing, e.g., binning, of the packets by the plurality of tiler backends, by performing atomic memory operations.

Once the first bounding box is written to Level 1 of the hierarchical bounding box data structure, it may then be determined if the highest level of the hierarchical bounding box data structure has been written 1703. The depth (e.g. the number of levels) of the hierarchical bounding box data structure may be implemented as a predefined depth value, for example, as a predefined fixed depth value of 3 levels (as will be appreciated, any number of levels may be predefined, e.g. 2, 4, 5, 6, 7, 8, and so on), or the depth may be implemented as a dynamic depth value, for example, the dynamic depth value may depend on the number of primitives. In the following description, the depth (e.g. number of levels) of the hierarchical bounding box data structure is implemented as a predefined fixed depth value of 3 levels.

As only Level 1 of the hierarchical bounding box data structure has been written then the determination 1703 is "No" in that the highest level of the hierarchical bounding box data structure has not yet been written based on the predefined depth value of 3 levels. Subsequently, after one or more levels of the hierarchical bounding box data structure have been written then the highest level of the hierarchical bounding box data structure may be reached and as such the determination 1703 is "Yes" and the process of building the hierarchical bounding box data structure is complete 1706 and the process ends.

If the highest level of the hierarchical bounding box data structure has not been reached, based on the determination 1703, the tiler backends may then perform a bounding box expansion atomic memory operation 1704. The bounding box expansion atomic memory operation may expand two (or more) of the bounding boxes of the previous level resulting in a new bounding box of the hierarchical bounding box data structure, such that the new bounding box is expanded to cover the two (or more) bounding boxes of a previous level. In pseudo-code, this may be implemented as, for example:

```
template <typename T>
struct BBox
{
T x_min, x_max, y_min, y_max;
};
template <typename T>
BBox<T> expand(BBox<T> a, BBox<T> b)
{
BBox<T> res;
res.x_min = min(a.x_min, b.x_min);
res.x_max = max(a.x_max, b.x_max);
res.y_min = min(a.y_min, b.y_min);
res.y_max = max(a.y_max, b.y_max);
return res;
}
```

Information representative of the expanded bounding box, e.g. the resulting component vector (preferably four component vector) of the expanded bounding box, can be written to memory.

Thus, expanding two or more bounding boxes is an atomic memory operation, wherein a commutative operation and an associative operation may be performed. Thus, the order with which multiple bounding boxes are expanded will not change the resultant expanded bounding box. In other words, as the atomic memory operation is associative and commutative then the order of the operations is not determining for the final result of the expanded bounding boxes. This advantageously enables a hierarchical bounding box data structure to be written by multiple tiler backends, e.g., by multiple concurrent writers.

For example, an atomic associative operation may be considered to be expand(A, expand(B,C))==expand(expand (A,B),C), and an atomic commutive operation may be considered to be expand(A,B)==expand(B,A).

As described hereinabove, an "atomic" memory operation is an operation sequence that performs an arithmetic operation between two (or more) bounding box component vectors stored in memory and then writes the resulting bounding box vector component to memory. This sequence of operations is carried out so that to every observer, it looks as if the sequence has either not been performed at all, or been performed in its entirety. It is executed as one indivisible unit, hence the name "atomic". If multiple atomics are performed on the same memory location, e.g. on the same bounding box vector component stored in the memory location, they are serialized. This is necessary to maintain the observable semantic that each of them has been performed either in full or not at all. The atomic memory operation enables the multi-level hierarchical bounding box data structure to be built by multiple (e.g. plural) concurrent programmable execution units.

In preferred embodiments, a comparison between the previous bounding box (e.g., the next highest-level bounding box) and the current expanded bounding box (e.g., the generated highest-level bounding box) is performed by the tiler backend 1705 to determine if the current level of bounding box (e.g. the generated bounding box) has been expanded in respect to the previous bounding box, e.g. expanded in at least one dimension represented by the component vector. In embodiments, the determination may be performed by comparing a memory value result (e.g. one or more of the components of the resultant four component vector) of the current bounding box with the memory value (e.g. one or more of the components of the resultant four component vector) of the previous bounding box. In pseudocode, this may be implemented as, for example:

```
template <typename T>
bool memory_was_expanded(BBox<T> current_bb, BBox<T>
old_memory_value)
    { return current_bb.x_min < old_memory_value.x_min ||
    current_bb.x_max > old_memory_value.x_max ||
    current_bb.y_min < old_memory_value.y_min ||
    current_bb.y_max > old_memory_value.y_max;
    }
```

If the determination is "Yes", e.g., the current bounding box has been expanded in at least one dimension, as indicated by the comparison of the one or more of the components of the resultant four component vector defining the bounding boxes stored in memory, then steps 1703 to 1705 shown in FIG. 17 are iteratively repeated to expand the bounding boxes to further, higher levels, of the hierarchical bounding box data structure.

If the determination is "No", e.g., the current bounding box has not been expanded in respect of the previous bounding box and the process for the tiler backend in writing to the hierarchical bounding box data structure has been completed and can be, for example, terminated.

FIG. 16 illustrates a hierarchical bounding box data structure which includes three hierarchy levels, according to embodiments. As will be appreciated there may be any number of hierarchy levels in the hierarchical bounding box data structure.

As illustrated in FIG. 16, the hierarchical bounding box data structure 1800 preferably includes a pointer tree 1801 and a primitive list 1802. The primitive list preferably includes one or more packets 1803 (e.g., tiling packets), Each packet 1803 may be written independently by a tiler backend and may include a reference to the visible primitives 1804 in the packet and, preferably, one or more state references 1805, e.g., drawcall descriptor (DCD), or any other suitable state reference.

The pointer tree 1801 of the hierarchical bounding box data structure 1800 is preferably a linear array at each level, and as shown in FIG. 16 there are three levels being a Level 1 Pointer array 1806, a Level 2 Pointer array 1807 and a Level 3 Pointer array 1808.

Level 1 Pointer array 1806 of the pointer tree 1801 may include one entry for each packet bounding box, wherein each packet bounding box bounds all of the one or more primitives of a respective packet. In embodiments, the array of bounding boxes includes a respective packet bounding box for each packet generated from the set of primitives in the primitive list 1802. Thus, in embodiments, the lowest level of the hierarchy of bounding boxes (Level 1) is represented by the array of primitive bounding boxes wherein each entry in the array preferably includes a union of all of the bounding boxes representative of each primitive in the packet, and a pointer 1809 to the respective packet in the primitive list 1802. Thus, in embodiments, only one tiler backend will write to an entry in the Level 1 Pointer array.

In embodiments, writing to the higher levels (Level 2 and Level 3 in FIG. 16, although as will be appreciated there may be any number of levels), may be performed by multiple tiler backends, in other words, the higher levels of the pointer tree are shared between multiple tiler backends.

In embodiments, the next (higher) level of the hierarchy of bounding boxes is represented by the array of packet bounding boxes. In embodiments, each entry, e.g., each bounding box, in the Level 2 Pointer array may include a union of multiple bounding box entries of the Level 1 Pointer array along with a pointer 1811 to the multiple bounding box entries of the previous (lower) level pointer array and, similarly, each entry, e.g., each bounding box, in the Level 3 Pointer array may include a union of multiple bounding box entries of the Level 2 Pointer array along with a pointer 1812 to the multiple bounding box entries of the previous (lower) level pointer array.

Thus, in embodiments, bounding boxes at the next (higher) hierarchy level are generated by combining bounding boxes using atomic memory operations, and so on. In embodiments, packets of primitives are generated (in the frontend process), and the hierarchy of bounding boxes is generated based on the packets of primitives (in the backend process) using the atomic memory operations.

As such, in embodiments, building the hierarchy of bounding boxes comprises: generating, for each primitive of a packet, a primitive bounding box that bounds the respective primitive; and generating, for each packet, a packet bounding box that bounds all of the one or more primitives of the respective packet. In embodiments, building the hierarchy of bounding boxes further comprises: generating, for each of one or more sets of plural packets, a respective higher-level bounding box of the multi-level hierarchical bounding box data structure that bounds all of the primitives of the plural packets of the respective set of plural packets using the atomic memory operations.

FIG. 10 illustrates an exemplary set of primitives defined for a render output, together with a corresponding hierarchy of bounding box, according to embodiments. It will be appreciated that FIG. 10 is simplified for illustrative purposes, and in practice there may be many more primitives and bounding boxes defined for a render output.

FIG. 10 shows a first set of primitives 121, 122, 123 that are included in a first packet generated by tiler frontend 610, and a second set of primitives 131, 132, 133 that are included in a second packet generated by tiler frontend 610. As illustrated in FIG. 10, a respective primitive bounding box 141, 142, 143, 151, 152, 153 is drawn around each primitive (and stored with the primitive attribute information 716 of the respective packet). Furthermore, a respective packet bounding box 161, 162 is drawn around the primitive bounding boxes for each packet (and stored in the packet array 700). FIG. 10 furthermore illustrates a next higher-level bounding box 171 that is drawn around the packet bounding boxes 161, 162 for the first and second packets (which may be stored in higher-level array 1110).

It will be appreciated that in this embodiment, each bounding box is an axis-aligned minimum bounding box, but other arrangements would be possible. For example, less precise bounding boxes, such as bounding boxes at the resolution of individual rendering tiles, may be used.

Once the bounding box hierarchy has been generated, it is used in a subsequent fragment processing pass to generate respective tiles of the overall render output. In the present example, these "fragment stages" start with a hierarchical bounding box reader stage reading the bounding box hierarchy. The hierarchical bounding box reader stage thus, in embodiments, replaces the primitive list reader 232 described above.

FIG. 11 illustrates schematically the hierarchical bounding box reader 1300 according to the present embodiment. The hierarchical bounding box reader 1300 reads the bounding box hierarchy array data 1100, 700, 1110, 1120 from memory 6 into cache 1330, and control unit 1320 controls hierarchy iterator 1310 to iterate through the bounding box hierarchy array data in order to identify packets whose packet bounding box 702 overlaps the current tile being processed. The iteration is such that packets will be identified in the order in which they were generated.

When a packet whose packet bounding box 702 overlaps the current tile is identified, packet fetcher 1340 fetches the packet data 710 into cache 1330, and then packet iterator 1350 iterates through the primitives in the packet in order to identify primitives whose primitive bounding box overlaps the current tile being processed. The iteration is such that primitives will be identified in the order in which they were originally specified.

When a primitive whose primitive bounding box overlaps the current tile is identified, the primitive is output by the hierarchical bounding box reader 1300 to the subsequent stages of the fragment processing pipeline. The primitive may thus be passed to the resource allocator 233 for processing, e.g. as described above. The primitives may thus be rasterised and rendered appropriately.

FIG. 12 illustrates the process performed by the hierarchical bounding box reader 1300, according to embodiments. The process of FIG. 12 is performed for each tile of a render output (e.g. frame), and iteratively steps through the bounding box hierarchy to determine which primitives are to be processed for the current rendering tile.

When (at step 1401) a new tile having coordinates (X, Y) is to be rendered, bounding box hierarchy information is fetched and used to determine whether the current tile overlaps a highest-level bounding box of the hierarchy. For each highest-level bounding box that the current tile is found to overlap, next lower-level bounding box information is used to determine whether the current tile overlaps a next lower-level bounding box of the hierarchy that is covered by the respective highest-level bounding box, and so on. As illustrated in FIG. 12, this process (steps 1402, 1403, 1404) iterates through higher-level bounding box arrays (e.g. arrays 1120 and 1110) until the packet bounding box hierarchy level is reached.

Then, for each higher-level bounding box that the current tile is found to overlap, packet bounding box information 702 is used to determine whether the current tile overlaps a packet bounding box that is covered by the respective higher-level bounding box (steps 1405, 1406, 1407). Then, for each packet bounding box that the current tile is found to overlap, primitive bounding box information is fetched from the packet 710 in question and used to determine primitives within the packet that are covered by the current rendering tile (steps 1408, 1409, 14010). Primitives found to be covered by the current rendering tile are output for rasterisation and rendering (step 1411).

Thus, in embodiments of the present invention, data representative of a set of bounding boxes is generated and written out in a first (geometry/tiling) processing pass, and then used in a second (fragment) processing pass to determine which primitives to process (rasterise and render) for which rendering tiles. The inventor has realised that this can, in effect, avoid the primitive list writing serialisation point of a tiling process such as described above with reference to FIGS. 4 and 5. This can then allow parallelisation, and thus improved performance, as well as scaling to different performance levels.

For example, FIG. 13 illustrates an embodiment in which tiler 220 comprises a single tiler frontend 610 and plural tiler backends 620A, 620B. FIG. 13 shows two backends, but it will be appreciated that other numbers of backends would be possible. It would also be possible to have plural tiler frontends 610.

In this embodiment, each packet generated by the tiler frontend 610 for a render output (e.g. frame) is assigned to one of the tiler backends 620A, 620B for processing. The tiler frontend 610 may, for example, assign packets to backends 620A, 620B using a round robin, first come first serve, or other scheduling scheme. The tiler backends 620A, 620B can then independently process packets, e.g. in parallel (at the same time), and write out bounding box information to the same bounding box hierarchy data structure (for the same draw call/render output).

In the above embodiments, both the tiling frontend 610 and backend 620 processes are performed by hardware units of a tiler 220.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A tile-based graphics processor that is operable to generate a render output by processing primitives to generate rendering tiles that the render output is divided into; the tile-based graphics processor comprising:
   a first processing circuit, wherein the first processing circuit comprises:
   a plurality of programmable execution units; and
   a plurality of backend circuits, wherein each backend circuit is associated with a respective programmable execution unit of the plurality of programmable execution units; wherein
   the first processing circuit is operable to:
      generate a multi-level hierarchical bounding box data structure comprising a set of bounding boxes representative of positions of a set of primitives to be processed to generate a render output, wherein each of the plurality of backend circuits concurrently write to the multi-level hierarchical bounding box data structure using atomic memory operations, wherein the atomic memory operations include one or more of a commutative operation and an associative operation;
      write out information representative of the set of bounding boxes; and
   a second processing circuit operable to, for one or more rendering tiles that a render output is divided into:
      use the multi-level hierarchical bounding box data structure generated by the first processing circuit to determine primitives of a set of primitives to process to generate the respective rendering tile; and process the determined primitives to generate the respective rendering tile.

2. The processor of claim 1, wherein the first processing circuit is operable to:

assign primitives of the set of primitives to one or more packets of one or more primitives; and process, by each of the backend circuits, a respective one or more packets to generate the set of bounding boxes.

3. The processor of claim 2, wherein each backend circuit is operable to process the respective one or more packets to generate the set of bounding boxes by:

generating, for each primitive of a packet, a primitive bounding box that bounds the respective primitive; and generating, for each packet, a packet bounding box that bounds all of the one or more primitives of the respective packet.

4. The processor of claim 3, wherein each backend circuit is operable to process the one or more packets to generate the set of bounding boxes by further generating, for one or more sets of plural packets, a respective higher-level bounding box of the multi-level hierarchical bounding box data structure that bounds all of the primitives of the plural packets of the respective set of plural packets using the atomic memory operations.

5. The processor of claim 1, wherein each backend circuit is operable to:

determine if the generated higher-level bounding box has been expanded in comparison to a next highest-level bounding box.

6. The processor of claim 5, in which each bounding box is defined as a four-component vector representing a maximum and minimum dimensions of each two-dimensional bounding box, and each backend circuit is further operable to:

compare each component of the four-component vector representing the generated higher-level bounding box to the respective component of the four-component vector representing the next highest-level bounding box.

7. The processor of claim 2, wherein the first processing circuit is operable to process plural packets at the same time.

8. The processor of claim 1, wherein the multi-level hierarchical bounding box data structure generated by the first processing circuit comprises a pointer tree and a primitive list.

9. The processor of claim 1, wherein the second processing circuit is operable to traverse the hierarchy of bounding boxes to determine the primitives to process to generate the rendering tile.

10. A method of operating a tile-based graphics processor that is operable to generate a render output by processing primitives to generate rendering tiles that the render output is divided into; the method comprising generating a render output by:

performing a first processing pass comprising:

generating a multi-level hierarchical bounding box data structure comprising a set of bounding boxes representative of positions of a set of primitives to be processed to generate a render output, wherein each of a plurality of backend circuits concurrently write to the multi-level hierarchical bounding box data structure using atomic memory operations, wherein the atomic memory operations include one or more of a commutative operation and an associative operation; and writing out information representative of the set of bounding boxes; and performing a second processing pass comprising, for one or more rendering tiles that the render output is divided into:

using the multi-level hierarchical bounding box data structure generated by the first processing pass to determine primitives of a set of primitives to process to generate the respective rendering tile; and processing the determined primitives to generate the respective rendering tile.

11. The method of claim 10, wherein performing first processing pass comprises:

assigning primitives of the set of primitives to one or more packets of one or more primitives; and processing, by each of the backend circuits, a respective one or more packets to generate the set of bounding boxes.

12. The method of claim 11, wherein processing, by each backend circuit, the respective one or more packets to generate the set of bounding boxes by:

generating, for each primitive of a packet, a primitive bounding box that bounds the respective primitive; and generating, for each packet, a packet bounding box that bounds all of the one or more primitives of the respective packet.

13. The method of claim 12, wherein processing, by each backend circuit, the one or more packets to generate the set of bounding boxes further comprises generating, for one or more sets of plural packets, a respective higher-level bounding box of the multi-level hierarchical bounding box data structure that bounds all of the primitives of the plural packets of the respective set of plural packets using the atomic operations.

14. The method of claim 11, further comprising:

determining, by each backend circuit, if the generated higher-level bounding box has been expanded in comparison to a next highest-level bounding box.

15. The method of claim 14, in which each bounding box is defined as a four-component vector representing a maximum and minimum dimensions of each two-dimensional bounding box, and the method further comprises:

comparing, by each backend circuit, each component of the four-component vector representing the generated higher-level bounding box to the respective component of the four-component vector representing the next highest-level bounding box.

16. The method of claim 11, further comprising processing plural packets at the same time.

17. The method of claim 10, wherein the multi-level hierarchical bounding box data structure comprises a pointer tree and a primitive list.

18. The method of claim 17, wherein each bounding box in a higher-level bounding box is associated with a pointer to the set of plural bounding boxes of the next highest-level in the multi-level hierarchical bounding box data structure.

19. The method of claim 10, wherein performing the second processing pass comprises traversing the hierarchy of bounding boxes to determine the primitives to process to generate the rendering tile.

20. A non-transitory computer program medium comprising computer software code for performing a method for generating a render output when the program is run on a data processing system, the method including:

performing a first processing pass comprising:

generating a multi-level hierarchical bounding box data structure comprising a set of bounding boxes representative of positions of a set of primitives to be processed to generate a render output, wherein each of a plurality of backend circuits concurrently write to the multi-level hierarchical bounding box data structure using atomic memory operations, wherein the atomic memory operations include one or more of a commutative operation and an associative operation;

writing out information representative of the set of bounding boxes; and performing a second processing pass comprising, for one or more rendering tiles that the render output is divided into:

using the multi-level hierarchical bounding box data structure generated by the first processing pass to determine primitives of a set of primitives to process to generate the respective rendering tile; and processing the determined primitives to generate the respective rendering tile.

\* \* \* \* \*